(12) United States Patent
Katayama

(10) Patent No.: US 6,597,466 B1
(45) Date of Patent: Jul. 22, 2003

(54) IMAGE FORMATION METHOD, IMAGE FORMATION CONTROL SYSTEM, AND IMAGE FORMATION SYSTEM

(75) Inventor: Takuya Katayama, Ebina (JP)

(73) Assignee: Fuji Xerox Co., Ltd., Toyko (JP)

( * ) Notice: Subject to any disclaimer, the term of this patent is extended or adjusted under 35 U.S.C. 154(b) by 0 days.

(21) Appl. No.: 09/286,661

(22) Filed: Apr. 6, 1999

(30) Foreign Application Priority Data

Apr. 8, 1998 (JP) ............................................. 10-095599

(51) Int. Cl.[7] ............................................... G06F 15/00
(52) U.S. Cl. ..................... 358/1.13; 358/1.8; 347/12; 347/20; 347/37
(58) Field of Search ..................... 358/1.5, 1.8, 1.13, 358/1.9; 347/1, 5, 8, 9, 12, 13, 15, 20, 24, 37, 40, 43

(56) References Cited

FOREIGN PATENT DOCUMENTS

| EP | 0 824 073 A2 | 2/1998 |
|---|---|---|
| JP | A-7-68750 | 3/1995 |
| JP | A-7-237321 | 9/1995 |
| JP | A-8-238805 | 9/1996 |

*Primary Examiner*—Mark Wallerson
(74) *Attorney, Agent, or Firm*—Oliff & Berridge, PLC

(57) ABSTRACT

At the print mode change time, at the recording time in the upper and lower margins of a recording medium, or the like, a head position management section causes horizontal scanning to be executed as many times as the number of print divisions while a move is made in a vertical scanning direction a minute move width at a time. At this time, the print width in each horizontal scanning is increased or decreased under the control of the head position management section. An image preparation section is made to transfer image data as wide as the print width from image memory to a band buffer in accordance with the control. A head section forms an image based on the print data in the band buffer under the control of a head control section. A move is made in the vertical scanning direction a minute move width at a time, whereby recording of one line with the same print element of the head section is lessened and the effect of the variations in the print elements can be excluded.

49 Claims, 15 Drawing Sheets

FIG. 4A FIG. 4B FIG. 4C
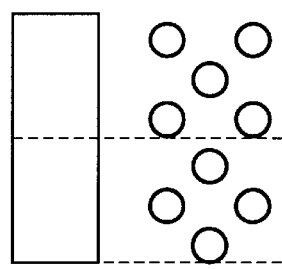
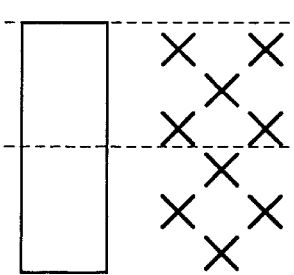
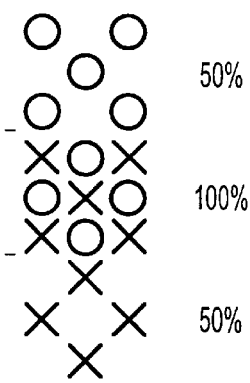
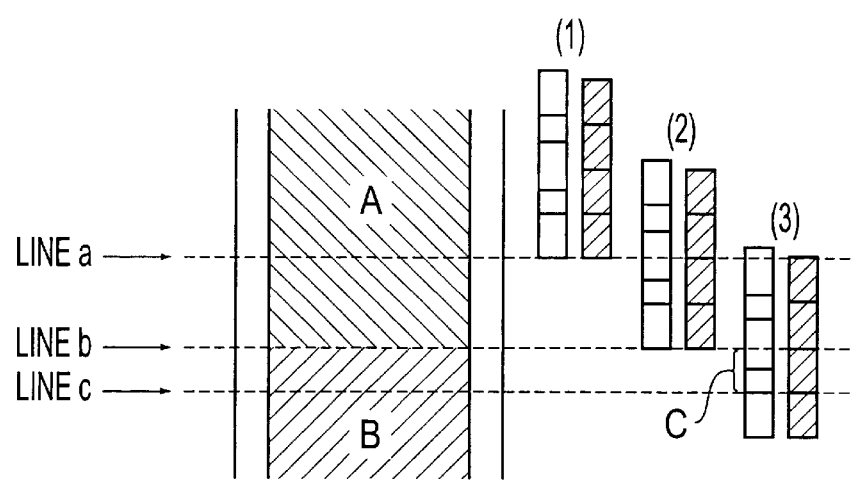
FIG. 5

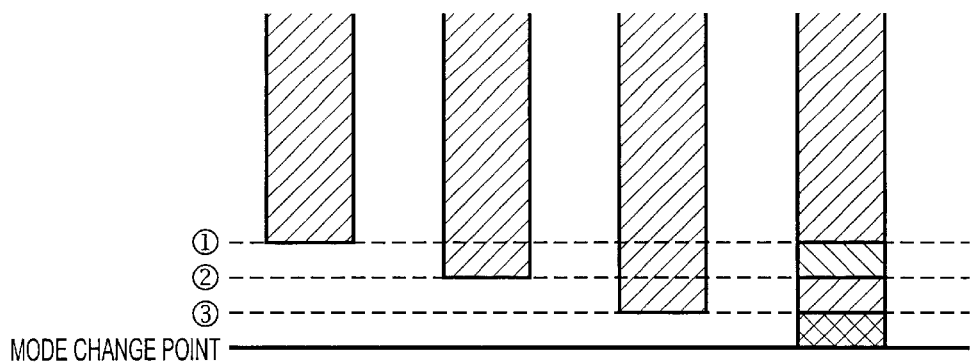
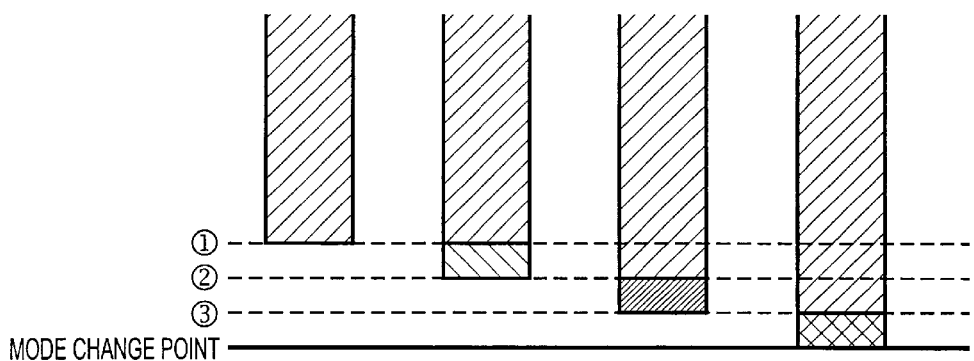
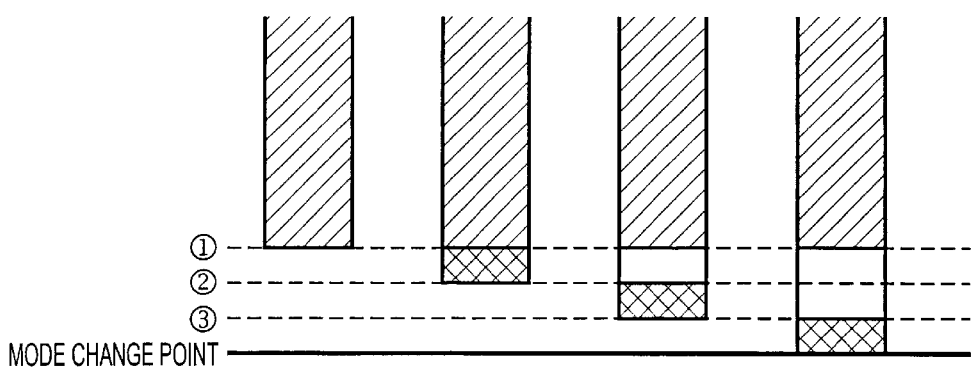

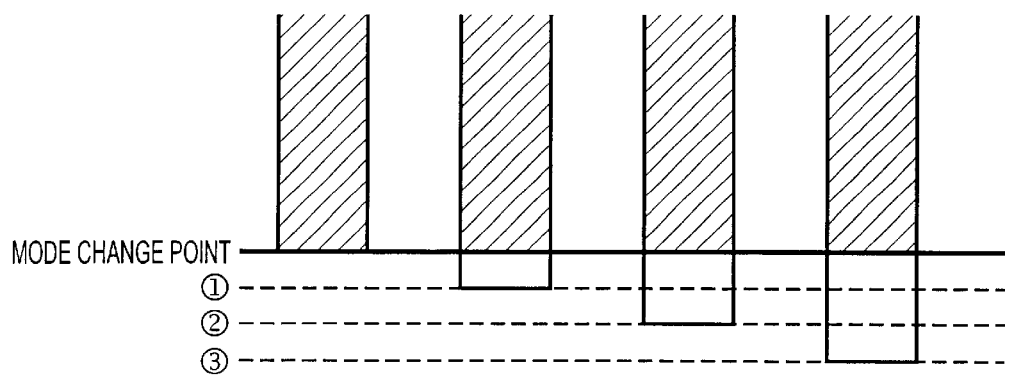

IMAGE FORMATION METHOD, IMAGE FORMATION CONTROL SYSTEM, AND IMAGE FORMATION SYSTEM

BACKGROUND OF THE INVENTION

This invention relates to an image formation method of a serial printer comprising heads each having a plurality of print elements for completing an image by performing the print operation more than once, an image formation control system for controlling the image formation of the serial printer, and an image formation system for forming an image.

FIG. 2 is an illustration to show a schematic configuration of an example of a general serial printer. In the figure, numeral 1 denotes a carriage drive motor, numeral 2 denotes a timing belt, numeral 3 denotes a recording head, numeral 4 denotes a carriage, numeral 5 denotes an ink tank, numeral 6 denotes a carriage guide, numeral 7 denotes a cable, numeral 8 denotes recording paper, numeral 9 denotes a paper feed motor, and numeral 10 denotes a feed roll. Here, an ink jet printer is shown as a serial printer example.

The carriage 4, which has the recording heads 3 mounted thereon, slides the carriage guides 6 and reciprocates in the horizontal scanning direction of arrow H in the figure. The carriage 4 is moved by the timing belt 2 driven by the carriage drive motor 1. In the example, two recording heads 3 are arranged in the move direction of the carriage 4.

The cable 7 is introduced into the recording heads 3 for supplying power to a heater in the recording heads and transmitting a signal to a drive circuit. The ink tanks 5 are attached to the recording heads 3 for supplying color inks. A plurality of nozzles are placed in each recording head 3 for jetting supplied ink to the recording paper 8 for recording. The recording paper 8 is driven by the feed roll 10 rotated by the paper feed motor 9 in the arrow P direction in the figure for vertical scanning. For the vertical scanning, in addition to such a method of moving the recording paper 8, a method of moving the carriage 4 in the vertical scanning direction, a method of moving both the recording paper 8 and the carriage 4 relatively, or the like is available.

A 2-head printer comprising a color head and a black head placed side by side on a carriage in the horizontal scanning direction each head having a plurality of print elements arranged in the vertical scanning direction as a recording head configuration in a serial printer has been developed as shown in FIG. 3, which is a schematic drawing to show an example of recording heads used with the 2-head printer. In FIG. 3, numeral 11 denotes a black head and numeral 12 denotes a color head. For example, in an ink jet system, nozzles are arranged in each recording head longitudinally in the figure. The black head 11 performs black recording with all or some of the arranged nozzles.

The nozzles arranged in the color head 12 are separated into groups in response to the number of used ink colors. Here, three color inks of cyan, magenta, and yellow are used and the nozzles for jetting their respective color inks are arranged in line. In FIG. 3, BK denotes black, C denotes cyan, M denotes magenta, and Y denotes yellow. The nozzle groups for jetting different color inks are spaced from each other for preventing colors from being mixed on the head face. Of course, any other color ink may be used.

In such a recording head, the number of nozzles that can print black differs from that of nozzles that can print a color other than black. To use such a recording head for printing, a black image can be printed with the black head width as a unit, thus can be printed at high speed. However, a color image can be printed only with the one-color width of the nozzles placed in the color head as a unit at the maximum. Normally, once the color mode is set, even a black area is printed only in color image print units. Thus, if an original with color and black areas mixed contains a black area that can be printed at high speed, high-speed print is not performed and the print speed lowers relatively.

To solve such a problem, whether the print object is color or black is determined and the print method is changed in response to whether the image to be printed is color or black, for example, as disclosed in the Unexamined Japanese Patent Application Publication No. Hei 8-238805. Thus, to print an original with color and black areas mixed, a black area is printed at high speed by making full use of the black head width, so that high-speed print is enabled as a whole.

On the other hand, a method of forming an image by horizontally scanning a single area more than once is used as one of recording methods. The number of horizontal scanning times is called the number of print divisions. If the number of print divisions is two, only 50% print is performed by executing horizontal scanning once, and 100% print is performed by executing horizontal scanning twice. Paper is fed half of the one-color print width of the color head or the whole print width of the black head between the first horizontal scanning and the second horizontal scanning. FIG. 4 is an illustration of an example of a print image formed by executing horizontal scanning twice; it shows only one color or black and only several dots. First, in print scanning shown in FIG. 4A, image data is thinned out 50% to prepare print data and the print data is printed. Here, assume that the dots indicated by ○ are printed. After the dots are printed, a relative move in the vertical scanning direction is made half of the print width of the color. In print scanning shown in FIG. 4B, print data of a pattern complementing the dots printed in FIG. 4A is prepared and printed. Here, the dots indicated by X are printed. Then, 100% print is complete as in the area at the middle stage shown in FIG. 4C. Such split print is performed for 100% print by executing horizontal scanning more than once, whereby misalignment of print scanning joints caused by a paper feed error and dot position misalignment caused by directivity variations in nozzles can be made inconspicuous and adjacent dots printed at the same time can be decreased for lessening bleeding for improving the image quality.

In the Unexamined Japanese Patent Application Publication No. Hei 8-238805, such split print in color mode is described, but such a print method in black mode is not used. To perform such split print in the black mode, the following problem occurs at the mode change time:

FIG. 5 is an illustration of the problem at the mode change time when split print is executed. Here, the number of print divisions is two. In FIG. 5, area A shown on the left is an area that can be printed only in black and area B is an area printed in color. Assume that recording heads exist at the position in the vertical scanning direction shown in (1) in the figure. In the next horizontal scanning, the tips of the heads are moved to line b and horizontal scanning is executed in the state in (2) in the figure. The first horizontal scanning of the area between lines a and b is executed. In this state, horizontal scanning of the area between lines a and b needs to be executed once more. If print is continued intact in the black mode, a relative move of the recording heads is made to the position in the vertical scanning direction shown in (3) in the figure and the second horizontal scanning of the area between lines a and b is executed.

However, at the position shown in (3) in the figure, the top of the area B is exceeded for the color of the color head at the bottom stage in the figure. Thus, if a transition to the color mode is made from the position and an attempt is made to execute color print, the color area between lines b and c (area C) cannot be printed in the color of the color head at the bottom stage in the figure. Thus, when the transition is made from the black mode to the color mode, a blank area as large as the print-impossible area is required.

This also applies when the transition is made from the color mode to the black mode; horizontal scanning is executed only once over the area of half of the black head width from the end line of the color mode and a desired density cannot be obtained. Thus, a blank area as large as the area is required.

A similar problem may also occur in cases other than the mode change between the color mode and the black mode. For example, a similar problem to that in FIG. 5 occurs in change between modes different in the number of print divisions because the modes differ in recording width. An area where horizontal scanning cannot be executed as many times as the number of print divisions occurs at the upper and lower end of a recording medium, and a margin as large as the area is required at the top and bottom of the recording medium.

To solve such a problem, the following recording method is possible, for example, in mode change between color and black modes: FIG. 6 is a schematic representation of a specific example of the operation at the change time from the black mode to the color mode in related art. In FIG. 6, the heads shown in FIG. 3 are used and the number of print divisions is two. The head portions used for print are hatched. In the example shown in FIG. 6, black characters and the hatched color portion are mixed.

Since a color image does not exist in the upper part of the image to be recorded, first the black mode is used for recording. Horizontal scanning is executed at the position in (1) in FIG. 6 and the first printing of the area between a line a and the line immediately preceding a line b is executed with the lower half of the black head. A move in the vertical scanning direction is made by half of the black head, then the whole black head is used for executing horizontal scanning at the position in (2) in FIG. 6, whereby the second printing of the area between the line a and the line immediately preceding the line b and the first printing of the area between the line b and the line immediately preceding a line c are executed.

Color data exists on a line d. This line d is assumed to be a mode change point. Change to the color mode is made at this mode change point. Before the transition to the color mode is made, the area between the line a and the line immediately preceding the line d is printed in the black mode for completing the image. A move in the vertical scanning direction is made to the line immediately preceding the line d and the black head is used for executing horizontal scanning at the position in (3) in FIG. 6, whereby the second printing of the area between the line b and the line immediately preceding the line c and the first printing of the area between the line c and the line immediately preceding the line d are executed.

In this state, the second printing of the area between the line c and the line immediately preceding the line d is not yet executed. Then, as shown in (4) in FIG. 6, horizontal scanning is again executed at the same position without changing the position in the vertical scanning direction, whereby the second printing of the area between the line c and the line immediately preceding the line d is executed and the printing in the black mode is terminated. At this point in time, the mode is changed to the color mode and the image on the line d and the later lines may be formed in the color mode.

In the color mode, while a move in the vertical scanning direction is made every half of the one-color print width of the color head, horizontal scanning is executed twice for the same area for forming a color image. For example, on the lines of the line d to the line immediately preceding a line e, printing is executed in the color corresponding to the lower end (top) of the color head in the figure in horizontal scanning in (5) and (6) in FIG. 6. After this, printing is executed in other colors in overlapped relation and an image can be formed in various colors.

FIG. 7 is a schematic representation of a specific example of the operation at the change time from the color mode to the black mode in related art. In this example, color data runs out on a line f and only monochrome data exists on the later lines. Thus, the line f is set to a mode change point and the lines immediately preceding the line f are printed in the color mode, then the mode is changed from the color mode to the black mode on the line f and the lines following the line f are printed in the black mode.

A color image to the line immediately preceding the line f in (1) to (10) in FIG. 7 is formed by performing the color mode operation described above. After horizontal scanning at the position in (10) in FIG. 7, a move in the vertical scanning direction is made so that the rear end of the black head is placed on the line f. The mode is changed from the color mode to the black mode, then recording is executed in the black mode. However, if the recording operation is performed in the black mode as it is, the area between the line f and the line immediately preceding a line i is printed only once. Then, the first printing of the area between the line f and the line immediately preceding the line i is executed at the position in (11) in FIG. 7 and the second printing of the area between the line f and the line immediately preceding the line i and the first printing of the area between the line i and the line immediately preceding a line k are executed at the position in (12) in FIG. 7, the same position as in (11) in FIG. 7. After this, printing may be executed in the normal black mode.

Thus, when the mode is changed from the black mode to the color mode, horizontal scanning is executed as many times as the number of print divisions at the same vertical scanning position before the mode is changed, and the image in the record area is completed in the black mode, then the mode is changed to the color mode. When the mode is changed from the color mode to the black mode, the image in the record area is completed in the color mode, then the mode is changed to the black mode and horizontal scanning is executed as many times as the number of print divisions at the same vertical scanning position only at the first time, then printing is executed in the normal black mode. The operation at the mode change time is thus performed, whereby the need for placing a blank area in the vicinity of the mode change point as described above is eliminated and smooth mode change can be made.

Likewise, for the change operation between modes different in record width, the mode is changed at a mode change point, then horizontal scanning is executed more than once at the same vertical scanning position, whereby smooth mode change can be made, for example, as described in the Unexamined Japanese Patent Application No. Hei 7-237321.

On the other hand, to record in a margin of a recording medium, a warp in the margin of the recording medium, etc., may cause the recording medium to come into collision with a moving head or the distance between the head and the recording medium to change, causing disorder in an image. To avoid this, recording is not executed in a state in which the margin of the recording medium exists in the record width of the head, and is executed with the recording medium pressed before and after the record width. Thus, a record-impossible area occurs in the upper and lower margins of the recording medium; preferably the record-impossible areas are small as much as possible. Particularly to form an image by executing horizontal scanning more than once, if an attempt is made to form an image in the vicinity of the upper and lower margins of the recording medium as the normal operation, an area where a 100% image is not provided occurs and also becomes a record-impossible area.

To decrease such areas where a 100% image is not provided, horizontal scanning can be performed more than once without feeding a recording medium in the vertical scanning direction in the upper and lower margins of the recording medium, for example, as described in the Unexamined Japanese Patent Application No. Hei 7-68750, whereby an image is also formed in the upper and lower margins of the recording medium by executing the recording operation more than once, the blank portions of the upper and lower margins of the recording medium can be lessened, and the image-record-possible areas can be widened.

However, if horizontal scanning is performed more than once at the same vertical scanning position at the mode change time or in the upper and lower margins of the recording medium, the same nozzle is used for recording on each line. The nozzles formed on the head vary in characteristics of the liquid jet direction, etc., because of variations in manufacturing the nozzles. The advantage of forming an image in the same area by executing horizontal scanning more than once as described above is that a different nozzle is used in each horizontal scanning for making inconspicuous trouble caused by directivity variations in the nozzles. For example, when the number of print divisions is four, if one nozzle becomes clogged, the print percentage of the clogged nozzle is about 25% per line at the maximum. Therefore, almost normal printing can be executed in the remaining 75%. However, in the image formation method in the related art, horizontal scanning is performed more than once at the same vertical scanning position in the vicinity of the mode change point or in the vicinity of the upper and lower margins of the recording medium. Thus, there is a possibility that inconsistencies in density, a white stripe, etc., will occur as the same line is recorded with the same nozzle.

SUMMARY OF THE INVENTION

It is therefore an object of the invention to provide an image formation method, an image formation control system, and an image formation system for reducing degradation of image quality at the mode change time between modes different in print width, such as black and color modes, at the recording time in the upper and lower margins of a recording medium, or the like.

In the invention, just after a first print mode is changed to a second print mode after an image to a mode change point is formed in the first print mode or when recording is executed at the top of an image formation-possible area of a recording medium where an image can be formed, while a move is made in a vertical scanning direction a minute move width at a time smaller than the move width in the vertical scanning direction in the second print mode or an image formation print mode, horizontal scanning is executed a predetermined number of times for forming an image just after the mode change point or at the top of the image formation-possible area, then image formation is executed in the second print mode or the image formation print mode. In such a case, in related art, horizontal scanning is executed a predetermined number of times at the same vertical scanning position, thus inconsistencies in density, white stripes, etc., occur due to manufacturing variations in print elements. In the invention, however, while a move is made in the vertical scanning direction a minute move width at a time, horizontal scanning is executed the predetermined number of times, so that printing the same line with the same print element is eliminated for most lines and occurrence of inconsistencies in density, white stripes, etc., can be suppressed for reducing degradation of image quality.

Likewise, when an image is formed just before change is made from the first print mode to the second print mode or when recording is executed in the end margin of an image formation-possible area of a recording medium where an image can be formed, in the vicinity of the mode change point or in the vicinity of the end margin of the image formation-possible area, while a move is made in the vertical scanning direction a minute move width at a time smaller than the move width in the vertical scanning direction in the first print mode or the print mode applied so far, horizontal scanning is executed a predetermined number of times for forming an image to the mode change point or to the end margin of the image formation-possible area. Thus, while a move is made in the vertical scanning direction a minute move width at a time, horizontal scanning is executed the predetermined number of times, so that printing the same line with the same print element is eliminated for most lines and occurrence of inconsistencies in density, white stripes, etc., can be suppressed for reducing degradation of image quality.

BRIEF DESCRIPTION OF THE DRAWINGS

In the accompanying drawings:

FIGS. 4A to 4C are schematic representation of an example of a print image formed by horizontal scanning twice;

FIG. 5 is a schematic representation of a problem at the mode change time when split print is executed;

FIGS. 11A to 11D are schematic representation of a first example of the operation in the vicinity of a mode change point at the mode change time from the black mode to the color mode;

FIGS. 12A to 12D are schematic representation of a second example of the operation in the vicinity of a mode change point at the mode change time from the black mode to the color mode;

FIGS. 13A to 13D are schematic representation of a third example of the operation in the vicinity of a mode change point at the mode change time from the black mode to the color mode;

FIGS. 14A to 14D are schematic representation of a fourth example of the operation in the vicinity of a mode change point at the mode change time from the black mode to the color mode;

DETAILED DESCRIPTION OF THE PREFERRED EMBODIMENS

Figure 1:
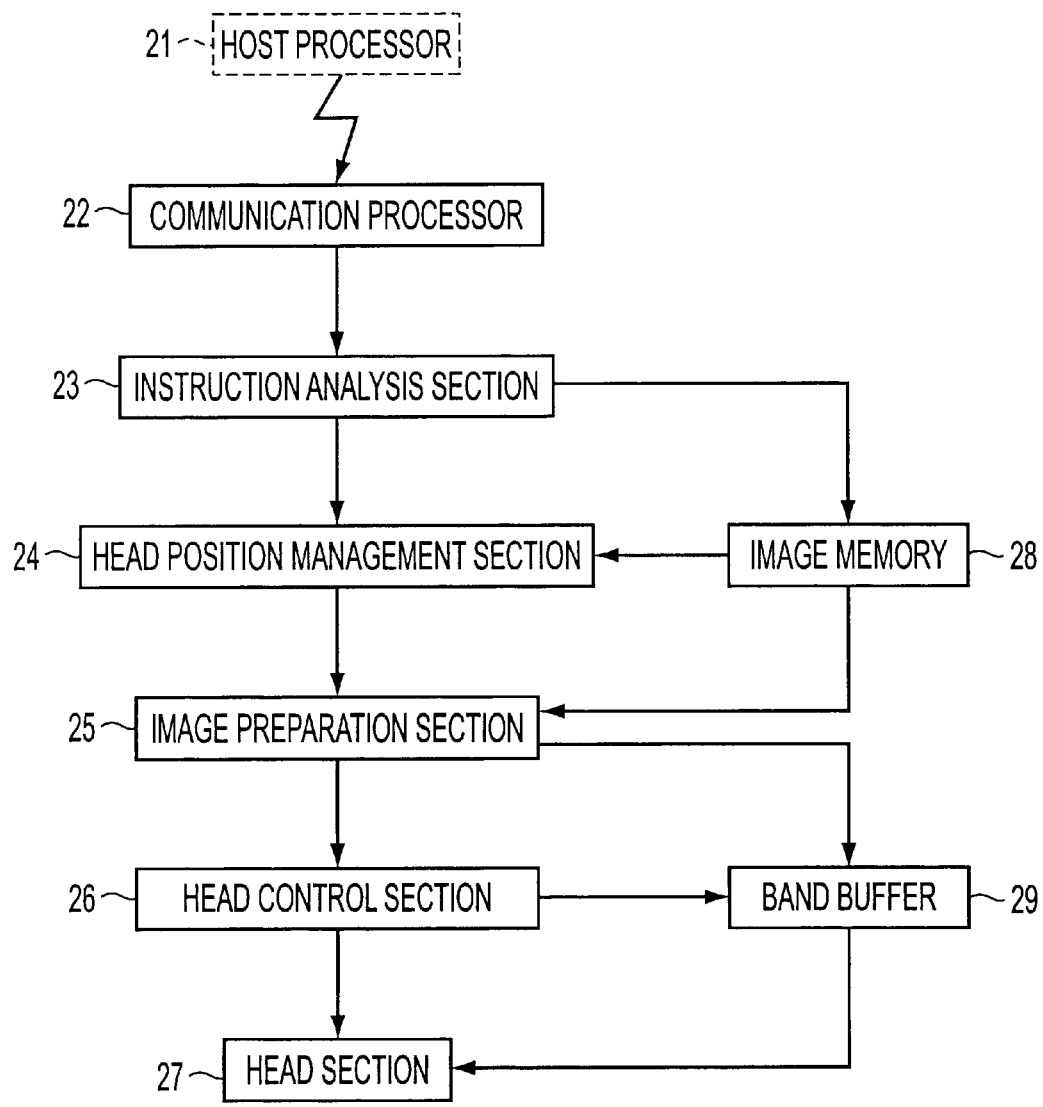
FIG. 1 is a block diagram to show one embodiment of the invention.
Figure 2:
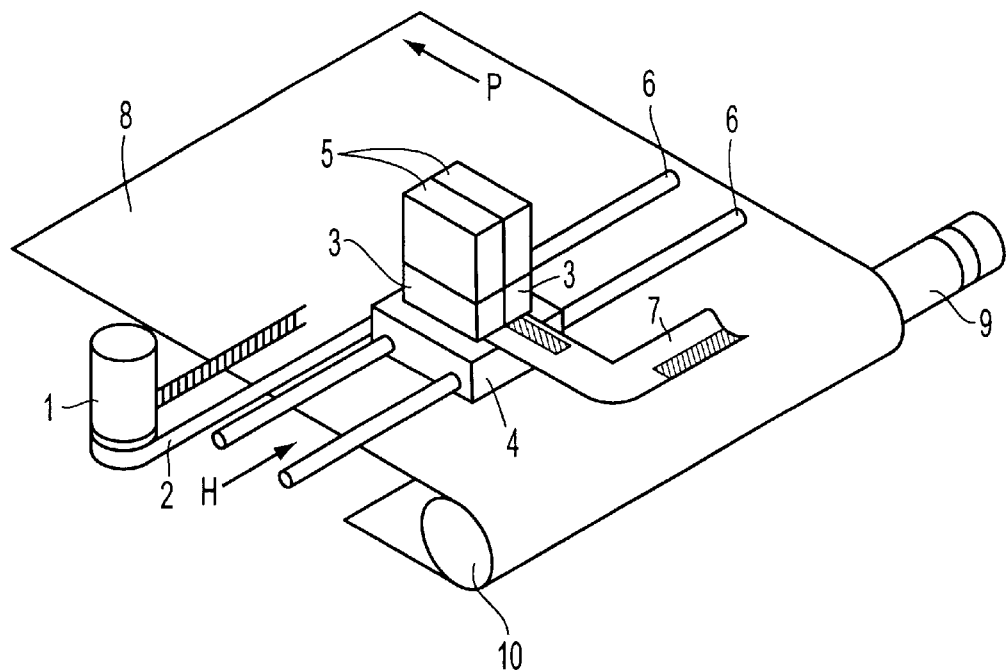
FIG. 2 is an illustration to show a schematic configuration of an example of a general serial printer.

FIG. 1 is a block diagram to show one embodiment of the invention. In the figure, numeral 21 denotes a host processor, numeral 22 denotes a communication section, numeral 23 denotes an instruction analysis section, numeral 24 denotes a head position management section, numeral 25 denotes an image preparation section, numeral 26 denotes a head control section, numeral 27 denotes a head section, numeral 28 denotes an image memory, and numeral 29 denotes a band buffer. The communication section 22 receives a print instruction sent from the host processor 21, etc., for example. It may be connected to the host processor 21 directly or via a network, etc., or may be connected to a storage unit such as a disk drive for fetching a print instruction from the storage unit. Further, the communication section 22 may be connected to an image reader such as a scanner.

The instruction analysis section 23 analyzes the print instruction received at the communication section 22 and sets or changes setup values and prepares image data in a bit map format for print in accordance with the print instruction. The image data prepared in the bit map format is stored in the image memory 28. If some processing is set for the image data prepared in the bit map format, the processing may be performed. Of course, when a bit map image is sent as the print instruction, it is stored in the image memory 28 intact or after predetermined processing is applied.

The head position management section 24 determines at least the next print position in the vertical scanning direction based on the image data stored in the image memory 28 and the print mode, etc., performs position control in the vertical scanning direction in response to the position, and instructs the image preparation section 25 to transfer image data of the area printed at the position. For example, a black mode for driving only a black head for printing, a color mode for driving both black and color heads for printing, and the like can be provided as the print mode. A special print mode such as a photo mode may be provided. The print modes are changed appropriately for printing. The head position management section 24 also controls the operation at the print mode change time. Further, it can also control the operation in the upper and lower margins of a recording medium as described later.

The image preparation section 25 reads image data corresponding to a band printed by color groups in the head section 27 from the image memory 28 in accordance with the position of the head section 27 in the vertical scanning direction determined by the head position management section 24 and stores the image data in the band buffer 29. At this time, to print the same area by performing horizontal scanning more than once, for example, as shown in FIG. 4, a filter responsive to the horizontal scanning at the time is applied to the image data before the image data is stored in the band buffer 29. FIG. 4 shows an example of completing the image by performing horizontal scanning twice; a filter for printing the dots at the ○ positions is used in FIG. 4A and a filter for printing the dots at the X positions is used in FIG. 4B. In the intermediate area in the figure, first the dots at the ○ positions are printed, then the dots at the X positions are printed. On the other hand, in the lower stage area in the figure, first the dots at the X positions are printed, then the dots at the ○ positions are printed. The filter is thus changed in response to each horizontal scanning and the same filter is used in one horizontal scanning. It is also possible that the filter is changed in response to the number of print times of each area. However, for example, printing must be performed so as to print X dots in the upper half and ○ dots in the lower half in FIG. 4B; processing becomes intricate and at the joints, the X and ○ dots adjoin each other and may be concatenated, changing the density. By adopting the method shown in FIG. 4, only one filter may be used in one horizontal scanning, processing can be made efficient, and the adverse effect of concatenating dots at the joints can be prevented although the dot formation order varies from one area to another.

When the image preparation section 25 has transferred the image data to the band buffer 29, the head control section 26 reads the image data in the band buffer 29 in sequence and gives a drive pulse to the head section 27 in response to a move of the head section 27 in the horizontal scanning direction.

Figure 3:
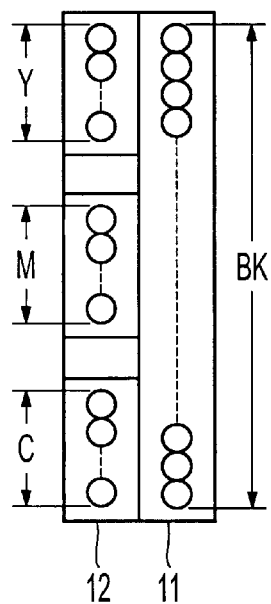
FIG. 3 is a schematic drawing to show an example of recording heads used with a 2-head printer.
Figure 6:
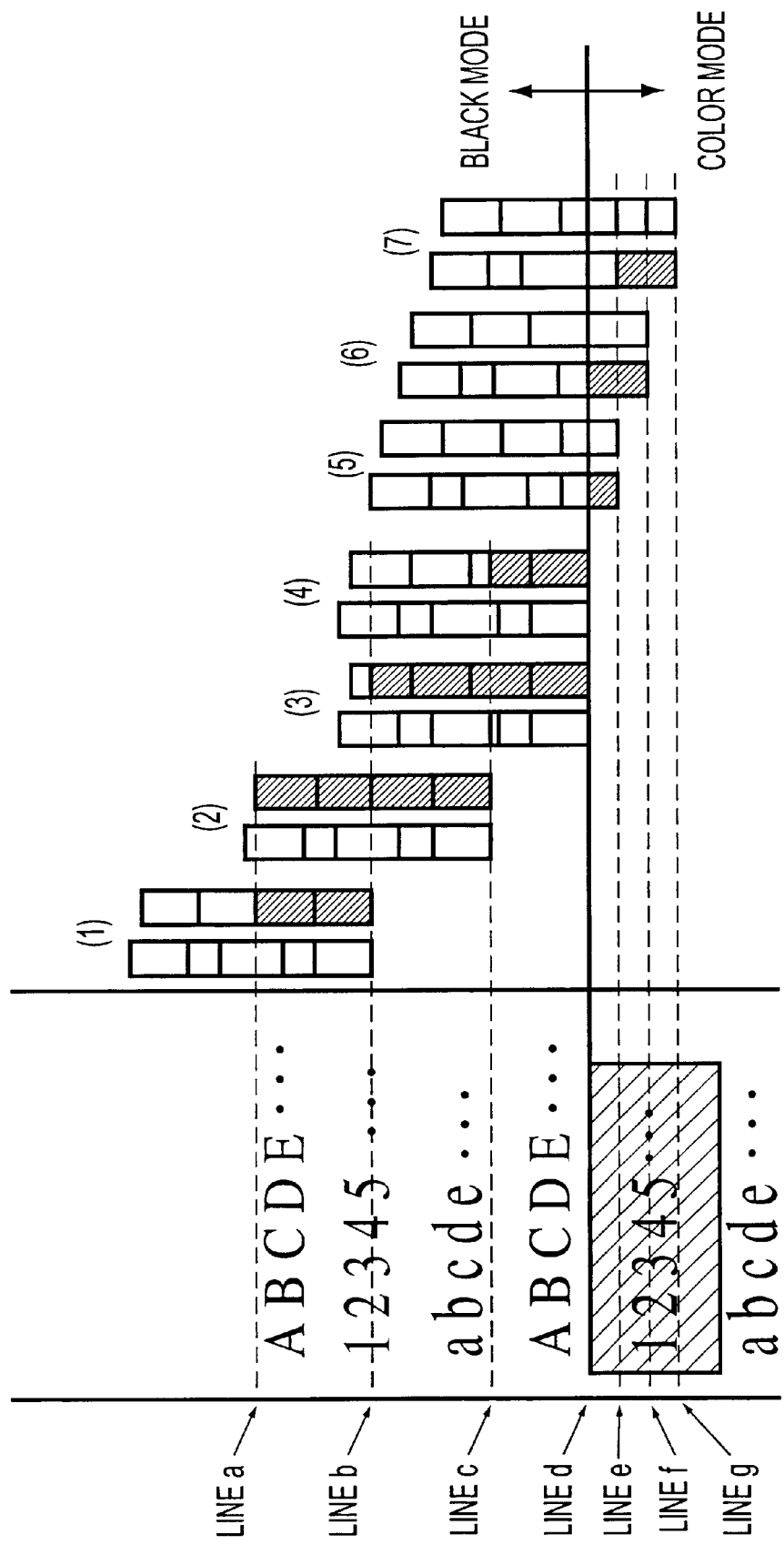
FIG. 6 is a schematic representation of a specific example of the operation at the change time from a black mode to a color mode in related art.
Figure 7:
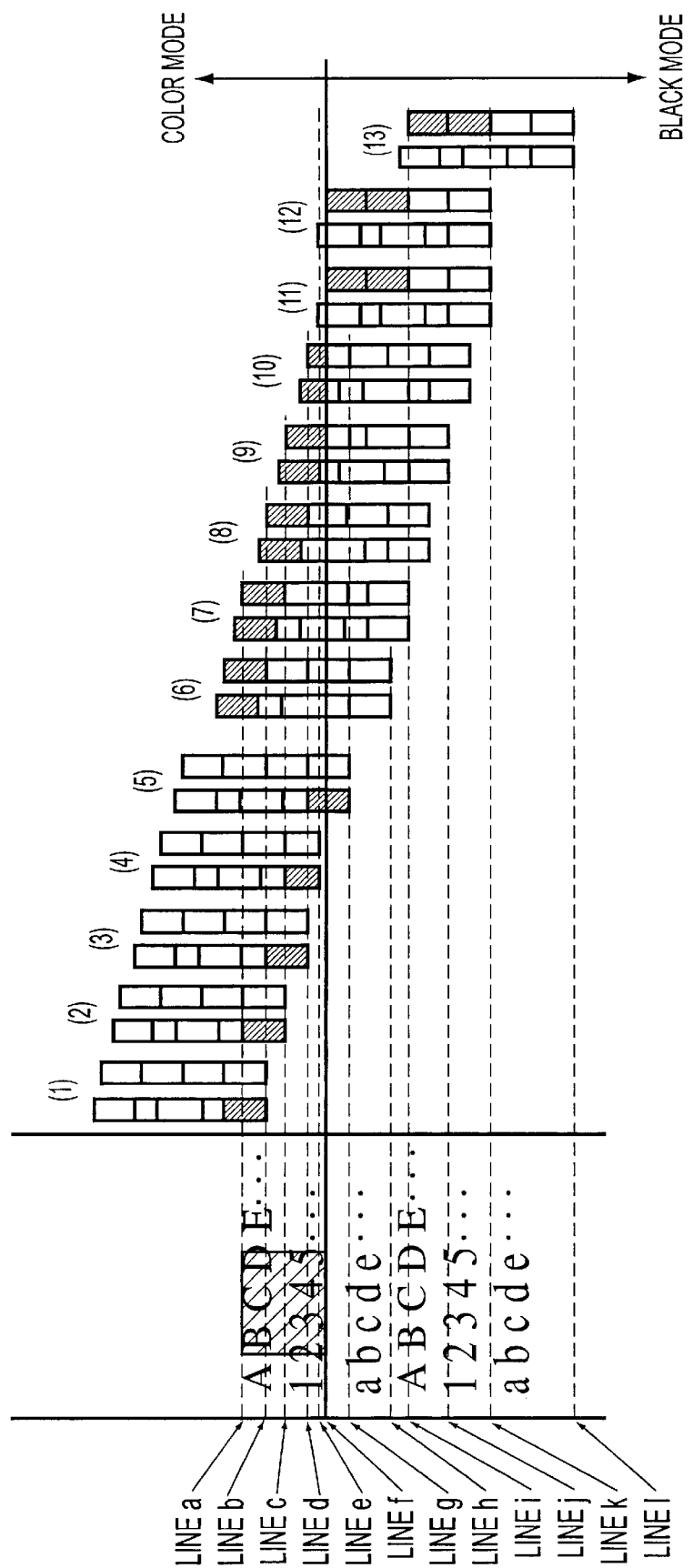
FIG. 7 is a schematic representation of a specific example of the operation at the change time from the color mode to the black mode in related art.

The head section 27 comprises a large number of print elements arranged in the vertical scanning direction for recording dots on a recording medium in response to the drive pulse given by the head control section 26 and the image data read from the band buffer 29. The head section consisting of the color head 12 and the black head 11, for example, as shown in FIG. 3 can be used as the head section 27. Color printing will be discussed, but a single-color head may be applied, of course. The color head is not limited to the composition shown in FIG. 3 and a color head of any composition such as a head with dark and light colors mixed for each color can be used.

Although the print instruction is sent from the host processor 21 in the example shown in FIG. 1, the instruction analysis section 23 is not required in a printer accepting image data only in the bit map format. The host may realize the functions of the communication section 22 to the image preparation section 25 and image data for printing with the print position managed by the head position management section 24 may be transferred to the band buffer 29 of the printer for printing the image data. Further, the image memory 28 and the band buffer 29 are separate components in FIG. 1, but may be provided as separate areas in the same storage unit.

Further, the head control section 26, the head section 27, and the band buffer 29 may be formed of an already existing serial printer as a separate unit and the communication section 22 to the image preparation section 25 may make up an image formation control system. This image formation control system can be installed not only in an image formation system together with the head section 27, etc., as shown in FIG. 1, but also in the host processor 21 as a printer driver.

Next, an example of the operation in the embodiment of the invention will be discussed. When a print instruction is sent from the host processor 21, the communication section 22 receives the print instruction and passes it to the instruction analysis section 23, which then analyzes the passed print instruction and sets or changes setup values and prepares image data in the bit map format for print in accordance with the print instruction. The prepared image data and the image data sent in the bit map format are written into the image memory 28.

The head position management section 24 prereads image data in the image memory 28 and determines at least the position of the head section 27 in the vertical scanning direction in response to the image to be printed. For example, if a reasonable blank area exists from the current tip position of the head section 27, the blank area need not be printed, thus the head position management section 24 performs the white skip operation for moving the head section 27. Of course, it may also determine the position of the head section 27 in the horizontal scanning direction and if a blank area exists in the horizontal scanning direction, it may be skipped under the control of the head position management section 24.

The head position management section 24 performs control responsive to the print position and the print mode. For example, it performs print control in the black mode in an area where a black image continues; it performs print control in the color mode in an area where an image containing any color other than black continues. Of course, in any other print mode, the head position management section 24 performs print control responsive to the print mode. To print in the vicinity of the upper and lower margins of a print-possible area on a recording medium, the head position management section 24 can also perform print control as described later. The head position management section 24 determines at least the position of the head section 27 in the vertical scanning direction in response to the print mode, its state, the print position, etc., and gives an instruction of the area of the image data transferred to the band buffer 29 to the image preparation section 25. The processing in each mode will be discussed later.

When the head position management section 24 determines at least the position of the head section 27 in the vertical scanning direction, the image preparation section 25 reads the image data of the band printed if horizontal scanning is executed at the determined position of the head section 27 from the image memory 28, uses the filter corresponding to the next horizontal scanning to filter the image data, and stores the resultant image data in the band buffer 29. For example, in the head configuration shown in FIG. 3, if the head section 27 is at the same position, cyan (C), magenta (M), and yellow (Y) print areas differ. Thus, the image preparation section 25 reads the image data responsive to each color print area from the image memory 28. Since the black mode and the color mode differ in print area with the black head 11, the image preparation section 25 reads the image data of the print area responsive to the mode from the image memory 28. After filtering the image data, the image preparation section 25 outputs the resultant image data. It also instructs the head control section 26 to execute printing.

The image data output from the image preparation section 25 is stored in the band buffer 29. Upon reception of the print execution instruction from the image preparation section 25, the head control section 26 reads the image data from the band buffer 29 in synchronization with the move timing of the head section 27 in the horizontal scanning direction and sends a drive pulse to the head section 27. The head section 27 records a dot in response to the image data and the drive pulse. For example, when the image data of one dot is "1," the head section 27 records the dot at the timing at which the drive pulse is given.

Figure 8:
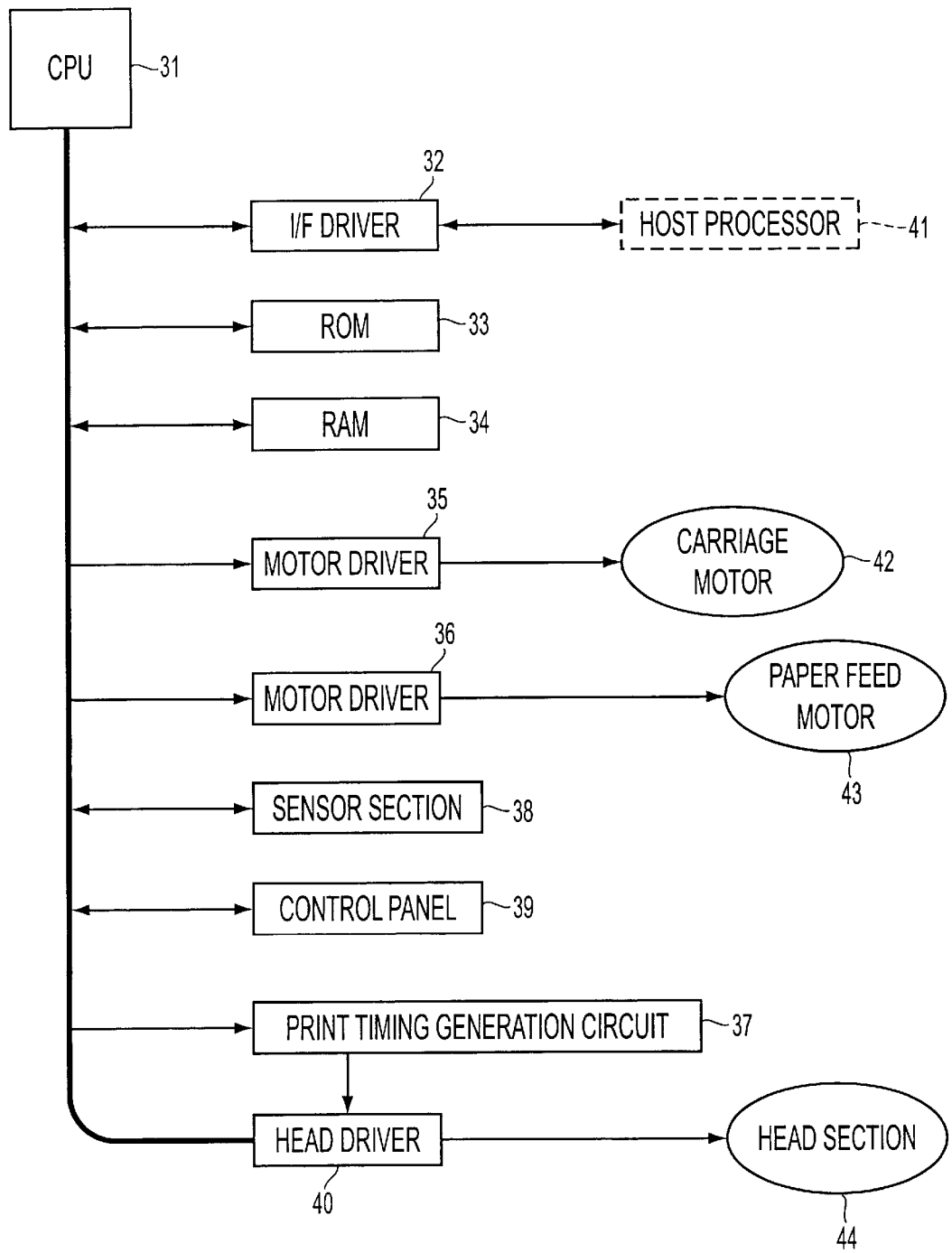
FIG. 8 is a block diagram to show a configuration example for realizing the embodiment of the invention.

FIG. 8 is a block diagram to show a configuration example for realizing the embodiment of the invention. In the figure, numeral 31 denotes a CPU (central processing unit), numeral 32 denotes an I/F (interface) driver, numeral 33 denotes a ROM (read-only memory), numeral 34 denotes a RAM (random access memory), numerals 35 and 36 are motor drivers, numeral 37 denotes a print timing generation circuit, numeral 38 denotes a sensor section, numeral 39 denotes a control panel, numeral 40 denotes a head driver, numeral 41 denotes a host processor, numeral 42 denotes a carriage motor, numeral 43 denotes a paper feed motor, and numeral 44 denotes a head section. Using the RAM 34, the CPU 31 controls the recorder components according to control procedures and data stored in the ROM 33 or detection data of the sensor section 38 containing a paper detection sensor. The CPU 31, which is connected to the host processor 41 such as a computer via the interface driver 32, stores record data such as image data sent from the host processor 41 in the RAM 34, interprets a command signal of a command, etc., and a record information signal from the host processor 41, and controls the record operation. The RAM 34 has a work area of the CPU 31 and also functions as an image memory in which the image data to be recorded for each color is expanded into dots and stored. The motor drivers 35 and 36 and the head driver 40 control the carriage motor 42, the paper feed motor 43, and the head section 44 respectively in accordance with instructions of the CPU 31. The print timing generation circuit 37 generates a timing signal for jetting ink from the head section 44 based on an instruction of the CPU 31 and supplies the timing signal to the head driver 40. The sensor section 38 senses the sections of the recorder with respect to a temperature, the ink amount, the presence or absence of paper, and the like, and transmits the sense result to the CPU 31. The recorder state is displayed on the control panel 39 and the user enters a command through the control panel 39.

The configuration shown in FIG. 8 can provide the configuration of the communication section 22 to the band buffer 29 in FIG. 1. Alternatively, the configuration shown in FIG. 8 may provide the head control section 26, the head section 27, and the band buffer 29 in FIG. 1 and the communication section 22 to the image preparation section 25 and the image memory 28 may be provided in the host processor 41.

Figure 9:
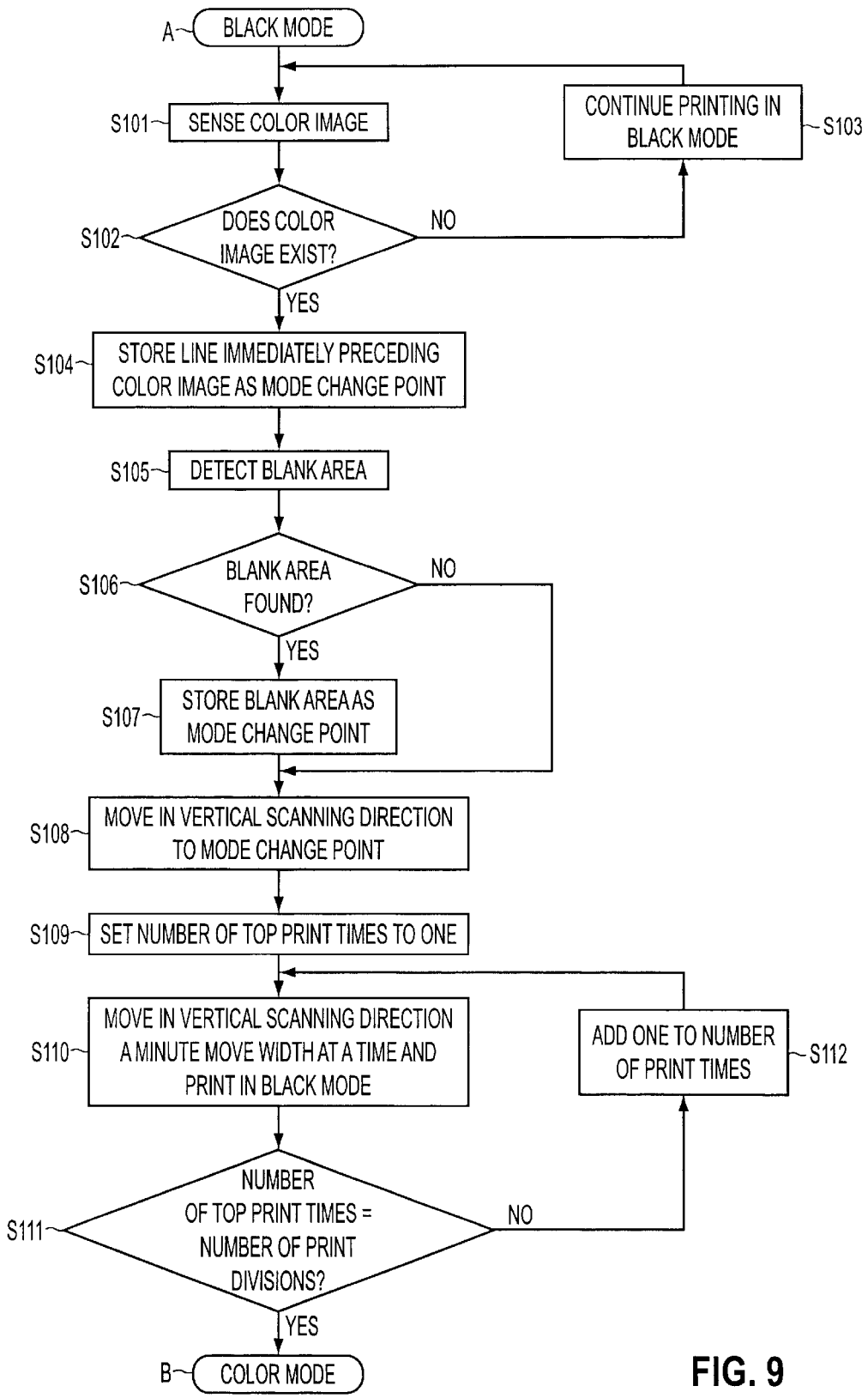
FIG. 9 is a flowchart to show an example of the operation at the change time from a black mode to a color mode in the embodiment of the invention.

Next, the operation of the head position management section 24 will be discussed. FIG. 9 is a flowchart to show one example of the operation at the change time from the black mode to the color mode in the embodiment of the invention. First, the operation at the change time from the black mode to the color mode will be discussed.

In the black mode, at step S101, image data of colors is preread for as many lines as the number of print dots of the black head divided by the number of print divisions. At step S102, whether the data to be printed is color data or black data is determined from the preread image data of colors and whether or not color data exists within the preread range is determined. If color data does not exist, control goes to step S103 at which the preread black data is used to continue printing in the black mode. That is, the black head is driven for executing horizontal scanning, then a relative move in the vertical scanning direction is made as wide as the width of as many lines as the number of print dots of the black head divided by the number of print divisions.

If color data exists within the preread range, the line immediately preceding the line where the color data exists can be set to a mode change point. This mode change point need not be the line immediately preceding the line where the color data exists and may exist preceding the line where the color data exists. For example, to use a filter in executing split print as described above, it is convenient to set the print position feed width in n-line units matching the size of the filter. To perform image processing in block units, the feed width may be limited matching the image processing blocks. Further, if feed control can be performed only in n-line units because of limitations in the feed mechanism in the vertical scanning direction, the feed width may be matched with the feed units. Alternatively, the mode change point may be set by any other method, for example, wherein a print object change point is detected by the instruction analysis section 23 and is adopted as the mode change point.

Here, if a blank line exists preceding the line where the color data exists in the preread range, it is set to the mode change point. In the print control, at the mode change point, horizontal scanning is not executed for printing across print areas in the color mode and the black mode. Thus, there is a possibility that a white stripe, inconsistencies in density, etc., at the joints will become conspicuous at the mode change point. Then, here, the line immediately preceding the line where the color data exists is stored as a temporary mode change point and when a blank area exists immediately preceding the line, a mode change point is set in the blank area. The mode is thus changed in a blank area as much as possible, whereby occurrence of a white stripe, inconsistencies in density, etc., at the mode change point can be decreased.

At step S104, the line immediately preceding the line where the color data exists is stored as a temporary mode change point. At step S105, a search is made for a blank line from the line where the color data exists to the top read line. If a blank line is found, control goes from step S106 to step S107 and the blank line is adopted as a mode change point. If a blank line is not found, the temporary mode change point stored at step S104 is used as mode change point intact.

The first found blank line is set as the mode change point; in addition, for example, if more than one blank line exists, any of the blank lines may be set as the mode change point. Particularly, to control the print position feed width in n-line units (where n is an integer of 2 or more), it is advisable to set the mode change point in a blank line movable in the vertical scanning direction before the first found blank line. To control the feed width in n-line units in such a manner, if a blank line exists, the mode change point may be unable to be set in the blank line. In this case, the mode change point may be set in a proper line that can be controlled before the line where color data exists, as in the case where a blank line does not exist.

At step S108, the mode change point is determined to be a new position of the head section 27 and the relative position of the head section 27 in the vertical scanning direction is controlled. At step S109, the number of top print times is set to one and at step S110, black mode print is executed with a relative move made in the vertical scanning direction as a minute move width. This minute move width corresponds to about one to several pixels and is exceptionally smaller than the move width in the vertical scanning direction in the black mode. In the black mode print at step S110, the move width in the vertical scanning direction at steps S108 and S110 is equal to or less than the normal move width in the vertical scanning direction, thus all print width of the black head 11 is not necessarily used for printing. Conversely, as the number of horizontal scanning times is increased, the print width is narrowed for printing. The image preparation section 25 transfers image data to the band buffer 29 so that only the image data as much as the print width is printed in accordance with an instruction of the head position management section 24.

At step S111, whether or not the number of top print times reaches the number of print divisions is determined. If horizontal scanning is not executed as many times as the number of print division, control goes to step S112 at which the number of top print times is incremented by one. Then, control returns to step S110, a relative move is made by the minute move width in the vertical scanning direction, and black mode print is executed repeatedly. At this time, the print width of the black head 11 is narrowed for printing so as to skip the portion where 100% print is already complete.

The horizontal scanning is thus executed as many times as the number of print divisions while a relative move is made by the minute move width in the vertical scanning direction, completing 100% print to the mode change point. At this time, the number of top print times becomes the number of print divisions, satisfying the condition at step S111, thus a transition is made to the color mode.

In the color mode, the color head and the black head are driven for printing. For example, if the number of print divisions is four, 25% print is executed a quarter at a time for each color of the color head. The black head prints with the same number of dots as those of each color of the color head; it executes 25% print a quarter of the printed dot string at a time.

In the normal operation of the colored mode, first the image data as wide as the print width of a single color in the color head divided by the number of print divisions is preread. At this time, if color data exists, the color mode print is continued. If there are lines with no print data from the top of the print area for each color, the lines can also be skipped.

If color data does not exist as a result of the prereading, further the image data as wide as the print width of the black head is preread. At this time, if color data exists, the color mode print is continued. If color data does not exist as a result of the prereading of the image data as wide as the print width of the black head, all data to the current position of the head is printed in the color mode, then the color mode is changed to the black mode for printing. The processing at this mode change time will be discussed later.

Figure 10:
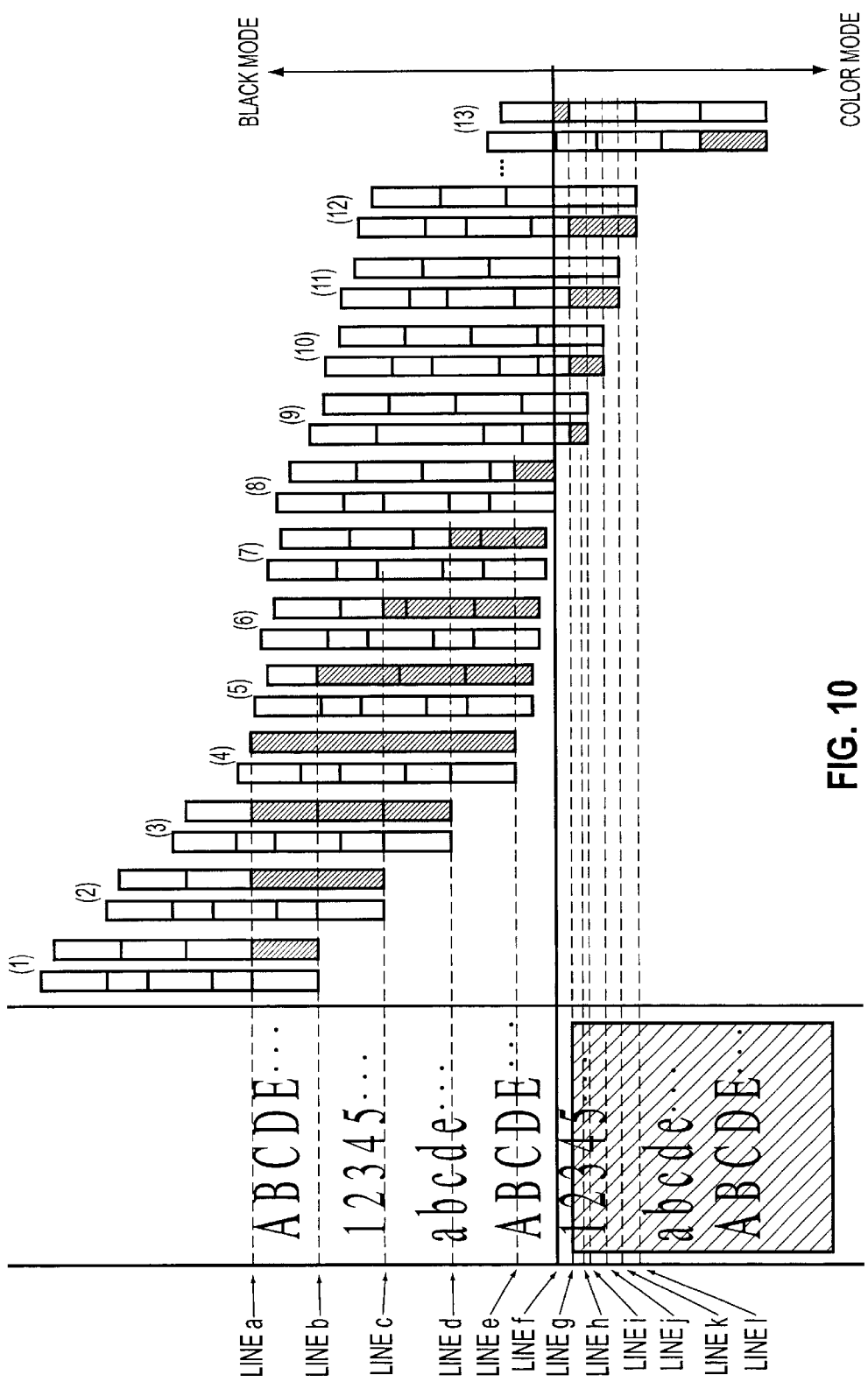
FIG. 10 is a schematic representation of a specific example of the operation at the change time from the black mode to the color mode in the embodiment of the invention.

FIG. 10 is a schematic representation of a specific example of the operation at the change time from the black mode to the color mode in the embodiment of the invention. In the description to follow, the head section shown in FIG. 3 is used as the head section 27. The color head prints three colors of cyan, magenta, and yellow each with an equal number of dots. In the figure, the colors are cyan, magenta, and yellow in order from the bottom to the top. The black head has as many dots as the number four times the number of dots of a single color. The current position of the head indicates the lower end of the print area of the head. Further, the number of print divisions is four and the same area is printed by executing horizontal scanning four times, forming a 100% image. To make a relative move in the vertical scanning direction, recording paper is moved. The portions of each head used for print are hatched.

In the example shown in FIG. 10, a line of "ABCDE . . . ," a line of "12345. . . ," and a line of "abcde . . . " are printed repeatedly in black. The hatched portion of the fifth line is printed in green by superimposing cyan and yellow. The green portion overlaps the lower part of the character string "12345. . . ".

Since blank exists in the upper part of the image, the recording paper is fed over the blank portion and the current position of the recording head is set to the upper end of the first line "ABCDE . . . ," namely, line a. In this state, the image data of each color as wide as a quarter of the print width of the black head is preread. Since the number of print divisions is four, a quarter of the print width is applied. In the example in FIG. 10, the image data between the line a and the line immediately preceding a line b is preread, wherein a black image exists, but color data other than black does not exist. Thus, black mode print is executed. The recording paper is fed to the line immediately preceding the line b and horizontal scanning is executed at the position in (1) in FIG. 10 for performing the first print of the area between the line a and the line immediately preceding the line b with the lower quarter of the black head.

After the printing in (1) in FIG. 10 in the figure, the black mode still remains. Thus, further the image data of each color as wide as a quarter of the print width of the black head is preread. In this case, color data does not exist either in the preread range, thus black mode print is executed. That is, the recording paper is fed to the line immediately preceding a line c and at the position in (2) in FIG. 10, the whole black head is used to execute horizontal scanning, whereby the second print of the area between the line a and the line immediately preceding the line b and the first print of the area between the line b and the line immediately preceding the line c are executed.

Further, the image data of each color as wide as a quarter of the print width of the black head is preread. In this case, color data does not exist either in the preread range, thus the recording paper is fed to the line immediately preceding a line d and at the position in (3) in FIG. 10, the whole black head is used to execute horizontal scanning, whereby the third print of the area between the line a and the line immediately preceding the line b, the second print of the area between the line b and the line immediately preceding the line c, and the first print of the area between the line c and the line immediately preceding the line d are executed. Likewise, the image data of each color as wide as the next quarter of the print width of the black head is preread. After a check is made to ensure that color data does not exist in the preread range, the recording paper is fed to the line immediately preceding a line e and at the position in (4) in FIG. 10, the whole black head is used to execute horizontal scanning, whereby the fourth print of the area between the line a and the line immediately preceding the line b, the third print of the area between the line b and the line immediately preceding the line c, the second print of the area between the line c and the line immediately preceding the line d, and the first print of the area between the line d and the line immediately preceding the line e are executed.

Further, the image data of each color as wide as another quarter of the print width of the black head (image data to the line immediately preceding a line h) is preread. In this case, color data exists on a line g. Thus, the line immediately preceding the line g is once retained as the mode change point. A search is made for a blank line from the line g to the head position. In this example, the line immediately preceding a line f is a blank line. Then, the line immediately preceding the found line f is set as the mode change point.

The black mode print is completed for the area to the mode change point. At this point in time, the fourth horizontal scanning is executed over the area between the line b and the line immediately preceding the line c, the third and fourth horizontal scannings are executed over the area between the line c and the line immediately preceding the line d, the second to fourth horizontal scannings are executed over the area between the line d and the line immediately preceding the line e, and horizontal scanning needs to be executed four times over the area between the line e and the line immediately preceding the line f. Thus, it becomes necessary to execute horizontal scanning four times to complete the image to the mode change point. (5) to (8) in FIG. 10 show the horizontal scanning executed four times. In the invention, the horizontal scanning is executed four times while recording paper is moved to the vertical scanning direction by minute move width at a time.

FIG. 11 is a schematic representation of a first example of the operation in the vicinity of the mode change point at the mode change time from the black mode to the color mode. Horizontal scanning in (5) to (8) in FIG. 10 can be executed at vertical scanning positions shown in (A) to (D) in FIG. 11, for example. That is, recording paper feed is controlled so that the head position comes to a line (1) shown in FIG. 11 by three times the minute move width before the mode change point. Horizontal scanning is executed, namely, as shown in (5) in FIG. 10 and (A) in FIG. 11, the fourth horizontal scanning is executed over the area between the line b and the line immediately preceding the line c, the third horizontal scanning is executed over the area between the line c and the line immediately preceding the line d, the second horizontal scanning is executed over the area between the line d and the line immediately preceding the line e, and the first horizontal scanning is executed over the area between the line e and the line (1) in FIG. 11.

Next, recording paper feed is controlled by the minute move width so that the head position comes to a line (2) shown in (B) in FIG. 11. Horizontal scanning is executed, namely, as shown in (6) in FIG. 10 and (B) in FIG. 11, the fourth horizontal scanning is executed over the area between the line c and the line immediately preceding the line d, the third horizontal scanning is executed over the area between the line d and the line immediately preceding the line e, the second horizontal scanning is executed over the area between the line e and the line (1), and the first horizontal scanning is executed over the area between the line next to the line (1) and the line (2).

Likewise, recording paper feed is controlled by the minute move width so that the head position comes to a line (3) shown in (C) in FIG. 11, and horizontal scanning is executed. That is, as shown in (7) in FIG. 10 and (C) in FIG. 11, the fourth horizontal scanning is executed over the area between the line d and the line immediately preceding the line e, the third horizontal scanning is executed over the area between the line e and the line (1), the second horizontal scanning is executed over the area between the line next to the line (1) and the line (2), and the first horizontal scanning is executed over the area between the line next to the line (2) and the line (3).

Further, recording paper feed is controlled by the minute move width so that the head position comes to the mode change point as shown in (D) in FIG. 11. To complete the image to the mode change point, as shown in (8) in FIG. 10 and (D) in FIG. 11, the fourth horizontal scanning is executed 25% over the area between the line e and the line (1), the third horizontal scanning is executed 50% over the area between the line next to the line (1) and the line (2), the second horizontal scanning is executed 75% over the area between the line next to the line (2) and the line (3), and horizontal scanning is executed 100% over the area between the line next to the line (3) and the mode change point.

Thus, the image to the mode change point can be printed 100%. At this time, different print elements are used to the line (3) and horizontal scanning is executed twice or more to form the image, so that occurrence of inconsistencies in density and a white stripe can be suppressed as compared with the case where the same print element is used to form the same line as the related art. Since the image is formed by executing horizontal scanning only once over the area between the line next to the line (3) and the mode change point, it is easily affected by the variations in the print elements. However, since the area is very minute and one or a few print elements are used, the probability of having large variations is also low as compared with the whole and the effect on the printed image is small.

FIG. 12 is a schematic representation of a second example of the operation in the vicinity of the mode change point at the mode change time from the black mode to the color mode. As in the first example, recording paper feed is controlled to that the head position comes to a line (1) shown in FIG. 12 by three times the minute move width before the mode change point. Horizontal scanning is executed, namely, as shown in (5) in FIG. 10 and (A) in FIG. 12, the fourth horizontal scanning is executed over the area between the line b and the line immediately preceding the line c, the third horizontal scanning is executed over the area between the line c and the line immediately preceding the line d, the second horizontal scanning is executed over the area between the line d and the line immediately preceding the line e, and the first horizontal scanning is executed over the area between the line e and the line (1) in FIG. 12.

Next, recording paper feed is controlled by the minute move width so that the head position comes to a line (2) shown in (B) in FIG. 12. Horizontal scanning is executed, namely, as shown in (6) in FIG. 10 and (B) in FIG. 12, the fourth horizontal scanning is executed over the area between the line c and the line immediately preceding the line d, the third horizontal scanning is executed over the area between the line d and the line immediately preceding the line e, and the second horizontal scanning is executed over the area between the line e and the line (1). Further, the first horizontal scanning is executed 50% over the area between the line next to the line (1) and the line (2).

Likewise, recording paper feed is controlled by the minute move width so that the head position comes to a line (3) shown in (C) in FIG. 12, and horizontal scanning is executed. That is, as shown in (7) in FIG. 10 and (C) in FIG. 12, the fourth horizontal scanning is executed over the area between the line d and the line immediately preceding the line e, the third horizontal scanning is executed over the area between the line e and the line (1), the second horizontal scanning is executed 25% over the area between the line next to the line (1) and the line (2), and the first horizontal scanning is executed 75% over the area between the line next to the line (2) and a line (3).

Further, recording paper feed is controlled by the minute move width so that the head position comes to the mode change point as shown in (D) in FIG. 12. As shown in (8) in FIG. 10 and (D) in FIG. 12, the fourth horizontal scanning is executed over the area between the line e and the line (1), the third horizontal scanning is executed 25% over the area between the line next to the line (1) and the line (2), and the second horizontal scanning is executed 25% over the area between the line next to the line (2) and the line (3), completing 100% image. Further, horizontal scanning is executed 100% over the area between the line next to the line (3) and the mode change point, completing the image to the mode change point.

Thus, the image to the mode change point can be printed 100%. Also, in this example, different print elements are used to the line (3) and horizontal scanning is executed twice or more to form the image, so that occurrence of inconsistencies in density and a white stripe can be suppressed as compared with the case where the same print element is used to form the same line as in the related art. Since the image is formed by executing horizontal scanning only once over the area between the line next to the line (3) and the mode change point, it is easily affected by the variations in the print elements. However, since the area is very minute and one or a few print elements are used, the probability of having large variations is also low as compared with the whole and the effect on the printed image is small.

FIG. 13 is a schematic representation of a third example of the operation in the vicinity of the mode change point at the mode change time from the black mode to the color mode. As in the first and second examples, recording paper feed is controlled so that the head position comes to a line (1) shown in FIG. 13 by three times the minute move width before the mode change point. Horizontal scanning is executed, namely, as shown in (5) in FIG. 10 and (A) in FIG. 13, the fourth horizontal scanning is executed over the area between the line b and the line immediately preceding the line c, the third horizontal scanning is executed over the area between the line c and the line immediately preceding the line d, the second horizontal scanning is executed over the area between the line d and the line immediately preceding the line e, and the first horizontal scanning is executed over the area between the line e and the line (1) in FIG. 13.

Next, recording paper feed is controlled by the minute move width so that the head position comes to a line (2) shown in (B) in FIG. 13. Horizontal scanning is executed namely, as shown in (6) in FIG. 10 and (B) in FIG. 13, the fourth horizontal scanning is executed over the area between the line c and the line immediately preceding the line d, the third horizontal scanning is executed over the area between the line d and the line immediately preceding the line e, and the second horizontal scanning is executed over the area between the line e and the line (1). Further, horizontal scanning is executed 100% over the area between the line next to the line (1) and the line (2), completing the image in the area.

Likewise, recording paper feed is controlled by the minute move width so that the head position comes to a line (3) shown in (C) in FIG. 13, and horizontal scanning is executed. That is, as shown in (7) in FIG. 10 and (C) in FIG. 13, the fourth horizontal scanning is executed over the area between the line d and the line immediately preceding the line e, and the third horizontal scanning is executed over the area between the line e and the line (1). Further, horizontal scanning is executed 100% over the area between the line next to the line (2) and the line (3), completing the image in the area.

Further, recording paper feed is controlled by the minute move width so that the head position comes to the mode change point as shown in (D) in FIG. 13. As shown in (8) in FIG. 10 and (D) in FIG. 13, the fourth horizontal scanning is executed over the area between the line e and the line (1). Further, horizontal scanning is executed 100% over the area between the line next to the line (3) and the mode change point, completing the image to the mode change point.

Thus, the image to the mode change point can be printed 100%. In this example, since the image is formed by executing horizontal scanning only once over the area between the line next to the line (1) and the mode change point, it is easily affected by the variations in the print elements. However, the area affected by the variations in the print elements is exceptionally lessened as compared with that in the related art; an image where occurrence of inconsistencies in density and a white stripe is suppressed can be provided.

FIG. 14 is a schematic representation of a fourth example of the operation in the vicinity of the mode change point at the mode change time from the black mode to the color mode. In this example, first, recording paper feed is controlled so that the head position comes to the mode change point. Then, horizontal scanning is executed, namely, as shown in (5) in FIG. 10, the fourth horizontal scanning is executed over the area between the line b and the line immediately preceding the line c, the third horizontal scanning is executed over the area between the line c and the line immediately preceding the line d, the second horizontal scanning is executed over the area between the line d and the line immediately preceding the line e, and the first horizontal scanning is executed over the area between the line e and the mode change point.

Next, recording paper feed is controlled by the minute move width so that the head position comes to a line (1) shown in (B) in FIG. 14. Horizontal scanning is executed, namely, as shown in (6) in FIG. 10, the fourth horizontal scanning is executed over the area between the line c and the line immediately preceding the line d, the third horizontal scanning is executed over the area between the line d and the line immediately preceding the line e, and the second horizontal scanning is executed over the area between the line e and the mode change point. The lines following the mode change point are not printed.

Likewise, recording paper feed is controlled by the minute move width so that the head position comes to a line (2) shown in (C) in FIG. 14, and horizontal scanning is executed. That is, as shown in (7) in FIG. 10, the fourth horizontal scanning is executed over the area between the line d and the line immediately preceding the line e, and the third horizontal scanning is executed over the area between the line e and the mode change point. In this case, the lines following the mode change point are not printed either.

Further, recording paper feed is controlled by the minute move width so that the head position comes to a line (3) shown in (D) in FIG. 14, and horizontal scanning is executed. That is, as shown in (8) in FIG. 10, the fourth horizontal scanning is executed over the area between the line e and the mode change point. In this case, the lines following the mode change point are not printed either.

Thus, the image to the mode change point can be printed 100%. In this example, the top of the head projects beyond the mode change point, but if the width (in this case, three times the minute move width) is equal to or less than a quarter of the print width of a single color of the color head, print can be continued without an problem if a transition is made to the color mode.

Thus, while a move is made by the minute move width in the vertical scanning direction as many times as the number of divisions (in this case, four), horizontal scanning is executed over the area to the mode change point for forming the image for the area, then the mode is changed to the color mode.

In the color mode, first the image data as wide as a quarter of the print width of a single color in the color head is preread. Color data does not exist in this area. When the image data of each color as wide as the print width of the black head is preread, color data exists on the line g. Then, print is executed in the normal color mode. It is assumed in the color mode that the rear-end quarter of the black head is used for printing.

At this time, if the head position is placed immediately preceding the line g, the data to be printed does not exist. When the head position is placed immediately preceding the line g, only the cyan part of the color head can print the area between the line next to the line f and the line immediately preceding the line g. In this area, however, cyan data does not exist. Although black print data exists in the area, in the example, black data in the color mode is printed with the read-end quarter of the black head and thus no print is executed at the position. Therefore, if the head position is placed immediately preceding the line g, the data to be printed does not exist and the white skip operation is performed.

Further, when the head position is placed immediately preceding the line g and preread is executed, color data exists. Then, the line immediately preceding a line i a quarter of the cyan print width ahead of the line g is determined to be the head position, and recording paper feed is controlled from the line f to the line immediately preceding the line i. Such white skip operation is performed for executing print at high speed. The image preparation section 25 is caused to transfer the cyan image data in the area between the line q and the line immediately preceding the line i. At this time, for other colors of the color head and black, image data transfer is not executed since the head portion used for printing lies before the mode change point. Horizontal scanning is executed at the position in (9) in FIG. 10, whereby the front-end quarter of the cyan part of the color head is used to execute the first cyan print in the area between the line g and the line immediately preceding the line i.

Next, the image data as wide as a quarter of the print width of a single color in the color head in the area between the line i and the line immediately preceding a line j is preread. This area also contains color data. Then, the head position is set to the line immediately preceding the line j and recording paper feed is controlled. The image preparation section 25 is caused to transfer the image data in the area between the line i and the line immediately preceding the line j. Horizontal scanning is executed at the position in (10) in FIG. 10, whereby the second print in the area between the line g and the line immediately preceding the line i and the first print in the area between the line i and the line immediately preceding the line j are executed with the whole cyan print width of the color head.

Likewise, preread of the image data as wide as a quarter of the print width of a single color in the color head, feed control of recording paper by a quarter of the print width of a single color, and horizontal scanning are repeated. When the area following the line f is contained in the upper-end quarter of the black head in the figure, the black area between the line f and the line g is printed in sequence. When the area following the line g is contained in the yellow print area of the color head, yellow is superposed on the cyan print part to generate green.

Figure 15:
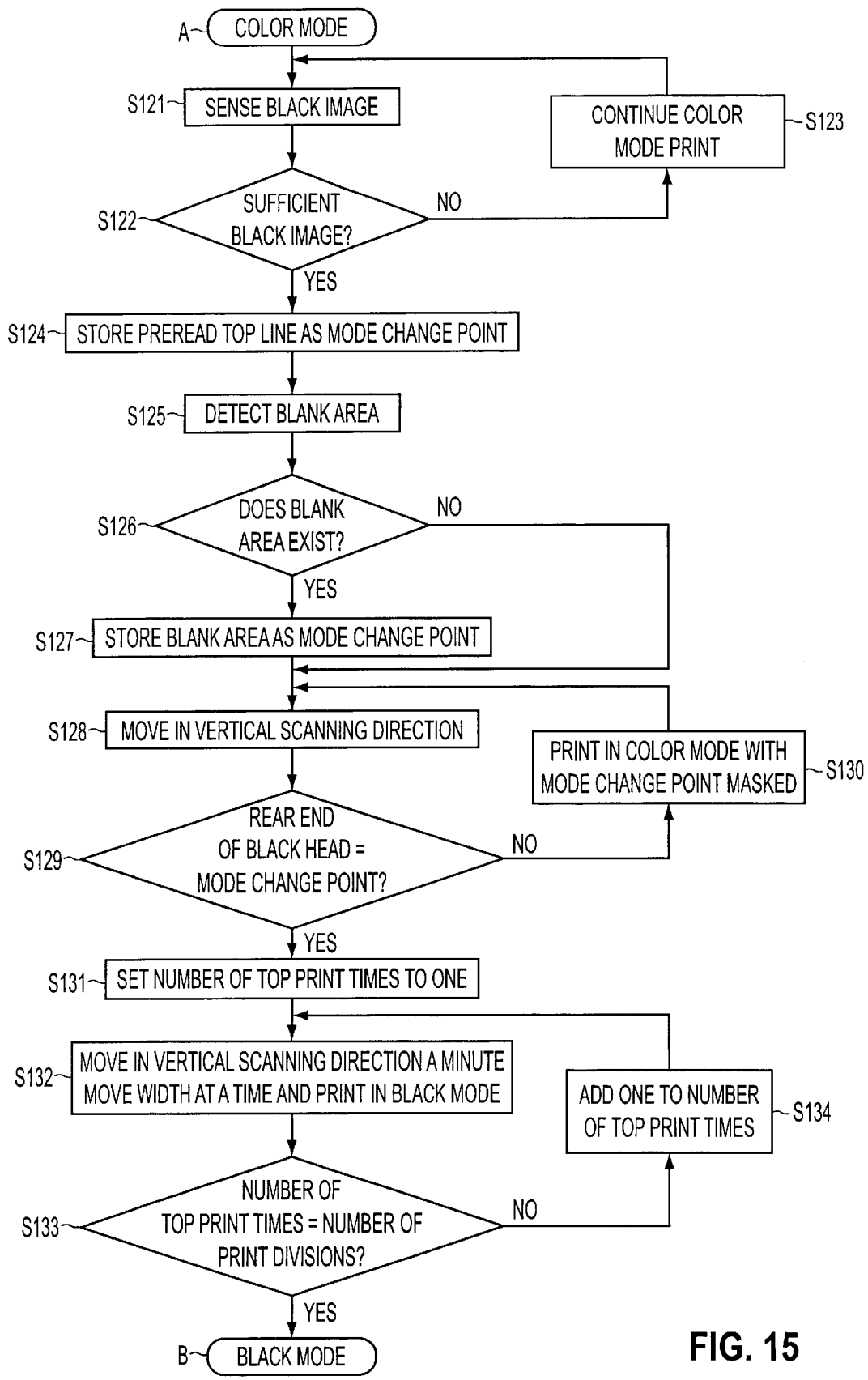
FIG. 15 is a flowchart to show an example of the operation at the change time from a color mode to a black mode in the embodiment of the invention.

FIG. 15 is a flowchart to show one example of the operation at the change time from the color mode to the black mode in the embodiment of the invention. Here, in contrast to the above-described operation, the description assumes that the operation is performed in the color mode, and the operation when the color mode is changed to the black mode will be discussed. In the color mode, both the black head and the color head are used for printing and at this time, only as many dots of the black head as the number of dots of a single color of the color head are used. For each color containing black, for example, if the number of print divisions is four, 25% print is executed with a quarter of each color including black and horizontal scanning is executed four times for completing 100% print.

In the color mode, at step S121, a black image is sensed. First, the image data of each color is preread for as many lines as the number of dots of a single color divided by the number of print divisions. Whether or not it contains color data is determined. If color data is contained, control goes to step S123 from step S122. If color data is not contained, further the image data of each color as wide as the print width of the black head is preread. Whether or not it contains color data is determined. If color data is contained, it is assumed at step S122 that a sufficient black image is not applied, and control goes to step S123 at which color mode print is executed. In the normal operation of the color mode, a relative move in the vertical scanning direction is made as wide as the print width of a single color of the color head divided by the number of print divisions and the color and black heads are driven for executing horizontal scanning for printing.

If color data does not exist in the image data preread as wide as the print width of the black head, control goes to change processing to the black mode. At this time, the top line of the preread image data can be adopted as the mode change point. As at the change time from the black mode to the color mode, the mode change point need not be set at the top of the preread image data. To make change from the color mode to the black mode, the mode change point may be set on any line if the line is a line following the first line of the preread data. For example, if an object change point is detected by the instruction analysis section 23, it may be set as the mode change point.

Here, a search is made for a blank line in the preread image data and if a blank line is found, the mode change point is set on the line as an example. Of course, like the mode change point from the black mode to the color mode described above, the mode change point may be set on the first found blank line; in addition, if blank lines exist across a number of lines, the mode change point may be set on any of the lines. If no blank line exists or if move control in the vertical scanning direction is not applied to any blank line under control every n (n is an integer of 2 or more) lines, for example, the mode change point may be set on any line following the line immediately preceding the top line of the preread image data.

At step S124, the top line of the preread image data is stored as a temporary mode change point. At step S125, a search is made for a blank line starting at the top line. If a blank line is found, control goes from step S126 to step S127 and the found blank line is adopted as a mode change point. If a blank line is not found, the temporary mode change point stored at step S104 is used as mode change point intact. After this, the image to the mode change point is printed in the color mode.

At step S128, the position to which a move is made in the vertical scanning direction as wide as the print width of a single color of the color head divided by the number of print divisions is determined to be a new position of the head section 27, and the relative position of the head section 27 in the vertical scanning direction. At this time, if a move in the vertical scanning direction is made to the new position of the head section 27, the rear end of the black head 11 may exceed the mode change point. In such a case, the position where the rear end of the black head 11 becomes the mode change point is determined to be a new position of the head section 27.

At step S129, whether or not the rear end of the black head 11 is the mode change point is determined. If the rear end of the black head 11 is not the mode change point, control goes to step S130 and the image preparation section 25 is instructed not to transfer the image following the mode change point, and print is executed in the color mode with mask so as not to print the image following the mode change point. Then, control returns to step S128. At steps S128 to S130, horizontal scanning is executed over the color area and the black area adjacent to the color area to a blank area as many times as the number of print divisions, completing the image.

If it is determined at step S129 that the rear end of the black head 11 becomes the mode change point, then print is executed in the black mode. However, if horizontal scanning is executed and a move in the vertical scanning direction is made as it is, the head section 27 is moved in a state in which horizontal scanning is executed once without executing horizontal scanning as many times as the number of print divisions, for example, in the portion just below the area printed in the color mode, thus the print density lowers. Thus, while a move is made a minute move width at a time in the vertical scanning direction, the print width of the black head 11 is increased gradually and horizontal scanning is executed as many times as the number of print divisions. Then, a transition is made to the normal black mode operation.

First, at step S131, the number of top print times is set to one. At step S132, while a move is made a minute move width at a time in the vertical scanning direction, print is executed with the black head 11. This minute move width corresponds to about one to several pixels and is exceptionally smaller than the move width in the vertical scanning direction in the black mode. At step S133, whether or not the number of top print times reaches the number of print divisions is determined. If horizontal scanning is not yet executed as many times as the number of print divisions, control goes to step S134 at which the number of top print times is incremented by one. Then, control returns to step S132 and horizontal scanning is executed.

Thus, a move is made only a minute move width at a time in the vertical scanning direction and print is executed with the black head 11 only as many times as the number of print divisions, whereby horizontal scanning is executed only as many times as the number of print divisions in the area just below the area printed in the color mode. A move is made the minute move width in the vertical scanning direction, whereby the same line is printed with different print elements inconsistencies in density, a white stripe can be decreased. Then, the normal black mode print may be executed. The print operation in the normal print mode was already described and will not be discussed again.

Figure 16:
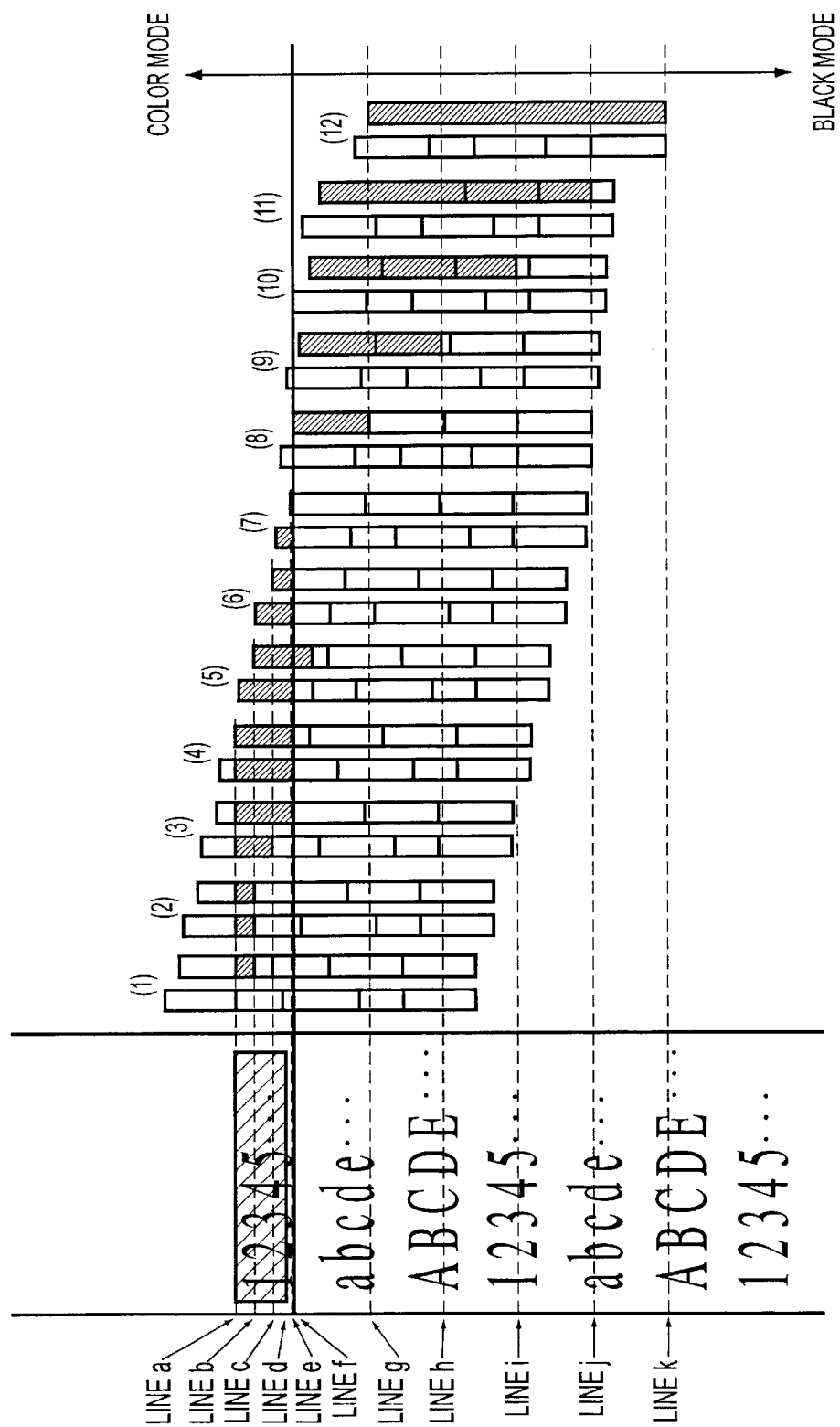
FIG. 16 is a schematic representation of a specific example in the example of the operation at the change time from the color mode to the black mode in the embodiment of the invention.

FIG. 16 is a schematic representation of a specific example in the example of the operation at the change time from the color mode to the black mode in the embodiment of the invention. The prerequisites in the description to follow are similar to those previously described with reference to FIG. 10. In the color mode, the top quarter of the black head in FIG. 16 is used for printing. In the example shown in FIG. 16, a line of "12345 . . . ," a line of "abcde . . . ," and a line of "ABCDE . . . " are printed repeatedly in black. The hatched portion of the first line is printed in yellow.

In the example shown in FIG. 16, a line a is the top of the image and the image data of each color of the area as wide as a quarter of the print width of a single color is preread. That is, the image data of the area between the line a and the line immediately preceding a line b is preread. It contains color data. However, the data to be printed at this position is yellow and black. Thus, recording paper is fed until the top of the black print area becomes the line immediately preceding the line b, as shown in (1) in FIG. 16. Horizontal scanning is executed at the position in (1) in FIG. 16 for executing the first print of a part of the area between the line a and the line immediately preceding the line b with the yellow print part of the color head. The first print of the area between the line a and the line immediately preceding the line b is executed with the rear-end quarter of the black head.

Further, the image data of each color as wide as a quarter of the print width of a single color of the color head is preread. Also in this case, color data exists in the preread range, thus color mode print is executed. That is, the recording paper is fed by quarter of the print width of a single color of the color head and horizontal scanning is executed at the position in (2) in FIG. 16 with the yellow print width of the color head and the print width of the rear-end quarter of the black head, thereby executing the second black print of the area between the line a and the line immediately preceding the line b, the second yellow print of part of the area, the first yellow print of other parts of the area, the first black print of the area between the line b and the line immediately preceding a line c, and the first yellow print of a part of the area.

Further, the image data of each color as wide as a quarter of the print width of a single color is preread. In this case, color data runs out on a line d. However, color data exists in the preread image data and thus the color mode print is continued as it is. The recording paper is fed by quarter of the print width of a single color of the color head and recording is executed in yellow and black at the position in (3) in FIG. 16.

Further, the image data of each color as wide as a quarter of the print width of a single color is preread. At this time, color data does not exist in the preread range. Thus, the image data of each color as wide as the print width of the black head is preread, but color data does not exist in the preread image data either. In such a case, change is made from the color mode to the black mode. To change from the color mode to the black mode, first the current position, namely, a line e is held as the mode change point and a search is made for a blank line. Then, a blank like exists on a line f. Thus, the line f is again set as the mode change point. The area to the line immediately preceding the line f of the mode change point is printed in the color mode for completing the image. After this, initial print in the black mode is executed and a transition is made to the normal black mode operation.

The color mode area print before the line f is terminated. In this processing, the image data following the line f is masked to skip printing the image data and the preceding image data is printed as in the normal color mode. That is, in (4) to (7) in FIG. 16, the recording paper feed operation a quarter of the print width of a single color of the color head and horizontal scanning are repeated and horizontal scanning is executed four times for each color over the area to the line immediately preceding the line f, thereby forming the image. At this time, the area between the line d and the line immediately preceding the line f is a black print area, but the area to the line immediately preceding the blank line (line f) is printed in the color mode.

After horizontal scanning is executed at the position in (7) in FIG. 16, the initial operation in the black mode is executed. In the initial operation, the image in the area between the line f and the line immediately preceding a line g is completed, the area between the line g and the line immediately preceding a line h is 75% printed, the area between the line h and the line immediately preceding a line i is 50% printed, and the area between the line i and the line immediately preceding a line j is 25% printed. Thus, while the recording paper is fed a minute move width at a time in the vertical scanning direction, horizontal scanning is executed four times, as shown in (8) to (11) in FIG. 16. FIG. 16 shows the horizontal scanning as if the horizontal scanning were executed four times at the same vertical scanning position, but in the invention, while the recording paper is fed a minute move width at a time in the vertical scanning direction, the horizontal scanning is executed.

Figures 17A, 17B, 17C, 17D:
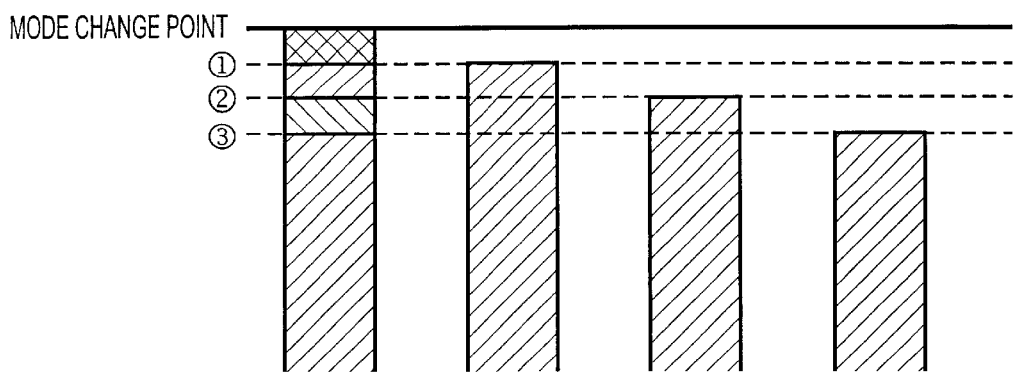
FIGS. 17A to 17D are schematic representation of a first example of the operation in the vicinity of a mode change point at the mode change time from the color mode to the black mode.

FIG. 17 is a schematic representation of a first example of the operation in the vicinity of the mode change point at the mode change time from the color mode to the black mode. Horizontal scanning in (8) to (11) in FIG. 16 can be executed at vertical scanning positions shown in (A) to (D) in FIG. 17, for example. That is, recording paper feed is controlled so that the rear end of the black head comes to the mode change point. Horizontal scanning is executed, namely, as shown in (8) in FIG. 16 and (A) in FIG. 17, the first horizontal scanning is executed over the area between the line f (mode change point) and the line immediately preceding the line g. At this time, for later move made a minute move width at a time in the vertical scanning direction, as shown in (A) in FIG. 17, horizontal scanning is executed 100% over the area of the minute move width between the line f (mode change point) and the line immediately preceding a line (1) for completing the image, horizontal scanning is executed 75% over the area of the minute move width between the line (1) and the line immediately preceding a line (2), and horizontal scanning is executed 50% over the area of the minute move width between the line (2) and the line immediately preceding a line (3).

Next, recording paper feed is controlled by the minute move width. Horizontal scanning is executed, namely, as shown in (9) in FIG. 16 and (B) in FIG. 17, the second horizontal scanning is executed over the area between the line (1) and the line immediately preceding the line g, and the first horizontal scanning is executed over the area between the line g and the line immediately preceding the line h, thereby completing the image for the area between the line (1) and the line immediately preceding the line (2) because 75% print is executed in the previous horizontal scanning.

Likewise, recording paper feed is controlled by the minute move width. Horizontal scanning is executed, namely, as shown in (10) in FIG. 16 and (C) in FIG. 17, the third horizontal scanning is executed over the area between the line (2) and the line immediately preceding the line g, the second horizontal scanning is executed over the area between the line g and the line immediately preceding the line h, and the first horizontal scanning is executed over the area between the line h and the line immediately preceding the line i, thereby completing the image for the area between the line (2) and the line immediately preceding the line (3) because 50% print is executed in the horizontal scanning in (A) in FIG. 17 and 25% print is executed in the horizontal scanning in (B) in FIG. 17.

Further, recording paper feed is controlled by the minute move width. Horizontal scanning is executed, namely, as shown in (11) in FIG. 16 and (D) in FIG. 17, the fourth horizontal scanning is executed over the area between the line (3) and the line immediately preceding the line g, the third horizontal scanning is executed over the area between the line g and the line immediately preceding the line h, the second horizontal scanning is executed over the area between the line h and the line immediately preceding the line i, and the first horizontal scanning is executed over the area between the line i and the line immediately preceding the line j, thereby completing the image for the area to the line immediately preceding the line g, and a transition can be made to print control in the normal black mode.

In such print control as described above, different print elements are used after the line (1) and horizontal scanning is executed twice or more to form the image, so that occurrence of inconsistencies in density and a white stripe can be suppressed as compared with the case where the same print element is used to form the same line as in the related art. Since the image is formed by executing horizontal scanning only once over the area between the mode change point and the line (1), it is easily affected by the variations in the print elements. However, since the area is very minute and one or a few print elements are used, the probability of having large variations is also low as compared with the whole and the effect on the printed image is small.

Figures 18A, 18B, 18C, 18D:
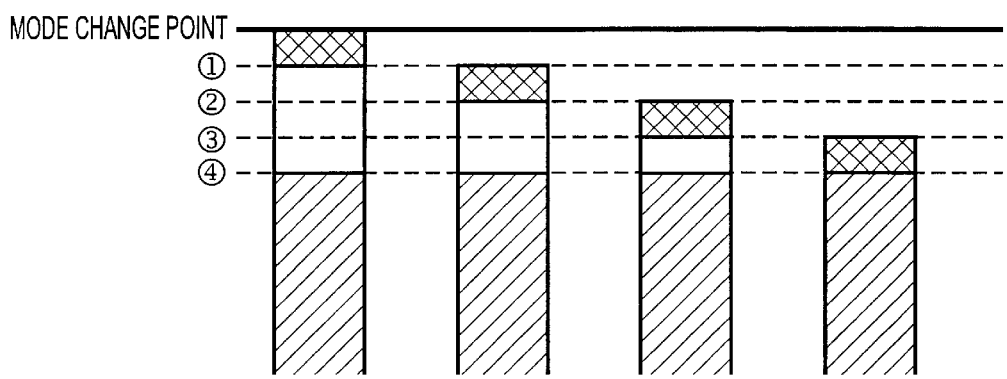
FIGS. 18A to 18D are schematic representation of a second example of the operation in the vicinity of a mode change point at the mode change time from the change mode to the black mode.

FIG. 18 is a schematic representation of a second example of the operation in the vicinity of the mode change point at the mode change time from the color mode to the black mode. Recording paper feed is controlled so that the rear end of the black head comes to the mode change point. Horizontal scanning is executed, namely, as shown in (8) in FIG. 16 and (A) in FIG. 18, the first horizontal scanning is executed over the area between a line (4) at a distance of four times the minute move width from the mode change point and the line immediately preceding the line g, and 100% print is executed for the area between the mode change point and the line immediately preceding a line (1).

Next, recording paper feed is controlled by the minute move width. Horizontal scanning is executed, namely, as shown in (9) in FIG. 16 and (B) in FIG. 18, the second horizontal scanning is executed over the area between the line (4) and the line immediately preceding the line g, and the first horizontal scanning is executed over the area between the line g and the line immediately preceding the line h. 100% print is executed for the area between the line (1) and the line immediately preceding a line (2).

Likewise, recording paper feed is controlled by the minute move width. Horizontal scanning is executed, namely, as shown in (10) in FIG. 16 and (C) in FIG. 18, the third horizontal scanning is executed over the area between the line (4) and the line immediately preceding the line g, the second horizontal scanning is executed over the area between the line g and the line immediately preceding the line h, and the first horizontal scanning is executed over the area between the line h and the line immediately preceding the line i. 100% print is executed for the area between the line (2) and the line immediately preceding a line (3).

Further, recording paper feed is controlled by the minute move width. Horizontal scanning is executed, namely, as shown in (11) in FIG. 16 and (D) in FIG. 18, the fourth horizontal scanning is executed over the area between the line (4) and the line immediately preceding the line g, the third horizontal scanning is executed over the area between the line g and the line immediately preceding the line h, the second horizontal scanning is executed over the area between the line h and the line immediately preceding the line i, and the first horizontal scanning is executed over the area between the line i and the line immediately preceding the line j. 100% print is executed for the area between the line (3) and the line immediately preceding the line (4).

In such print control, different print elements are used after the line (4) and horizontal scanning is executed twice or more to form the image, so that occurrence of inconsistencies in density and a white stripe can be suppressed as compared with the case where the same print element is used to form the same line as in the related art. Since the image is formed by executing horizontal scanning only once over the area between the mode change point and the line (4), it is easily affected by the variations in the print elements. However, the area is small as compared with that in the related art, and the effect on the printed image is small. For the area between the line (3) and the line immediately preceding the line (4), 25% print may be executed in each horizontal scanning for completing the image.

Figures 19A, 19B, 19C, 19D:
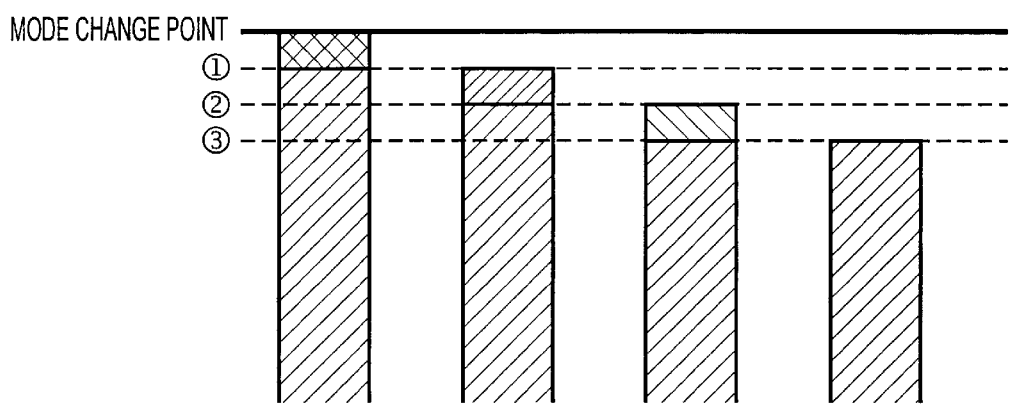
FIGS. 19A to 19D are schematic representation of a third example of the operation in the vicinity of a mode change point at the mode change time from the color mode to the black mode.

FIG. 19 is a schematic representation of a third example of the operation in the vicinity of the mode change point at the mode change time from the color mode to the black mode. Also in this example, recording paper feed is controlled so that the rear end of the black head comes to the mode change point. Horizontal scanning is executed, namely, as shown in (8) in FIG. 16 and (A) in FIG. 19, 100% print is executed for the area between the mode change point and the line immediately preceding a line (1) as wide as the minute move width from the mode change point, and the first horizontal scanning is executed 25% over the area between the line (1) and the line immediately preceding the line g.

Next, recording paper feed is controlled by the minute move width. Horizontal scanning is executed, namely, as shown in (9) in FIG. 16 and (B) in FIG. 19, the second horizontal scanning is executed 75% over the area between the line (1) and the line immediately preceding a line (2), completing the area image. The second horizontal scanning is executed over the area between the line (2) and the line immediately preceding the line g, and the first horizontal scanning is executed over the area between the line g and the line immediately preceding the line h.

Likewise, recording paper feed is controlled by the minute move width. Horizontal scanning is executed, namely, as shown in (10) in FIG. 16 and (C) in FIG. 19, the third horizontal scanning is executed 50% over the area between the line (2) and the line immediately preceding a line (3), completing the area image. The third horizontal scanning is executed over the area between the line (3) and the line immediately preceding the line g, the second horizontal scanning is executed over the area between the line g and the line immediately preceding the line h, and the first horizontal scanning is executed over the area between the line h and the line immediately preceding the line i.

Further, recording paper feed is controlled by the minute move width. Horizontal scanning is executed, namely, as shown in (11) in FIG. 16 and (D) in FIG. 19, the fourth horizontal scanning is executed over the area between the line (3) and the line immediately preceding the line g, the third horizontal scanning is executed over the area between the line g and the line immediately preceding the line h, the second horizontal scanning is executed over the area between the line h and the line immediately preceding the line i, and the first horizontal scanning is executed over the area between the line i and the line immediately preceding the line j, thereby completing the image for the area between the mode change point and the line immediately preceding the line g.

Also in such print control, different print elements are used after the line (1) and horizontal scanning is executed twice or more to form the image, so that occurrence of inconsistencies in density and a white stripe can be suppressed. Since the image is formed by executing horizontal scanning only once over the area between the mode change point and the line (1), it is easily affected by the variations in the print elements. However, the area is minute and the probability that the variations will occur in the print elements in the area is low. Thus, the effect on the printed image is small and degradation of the image quality in the vicinity of the mode change point can be suppressed.

Figures 20A, 20B, 20C, 20D:
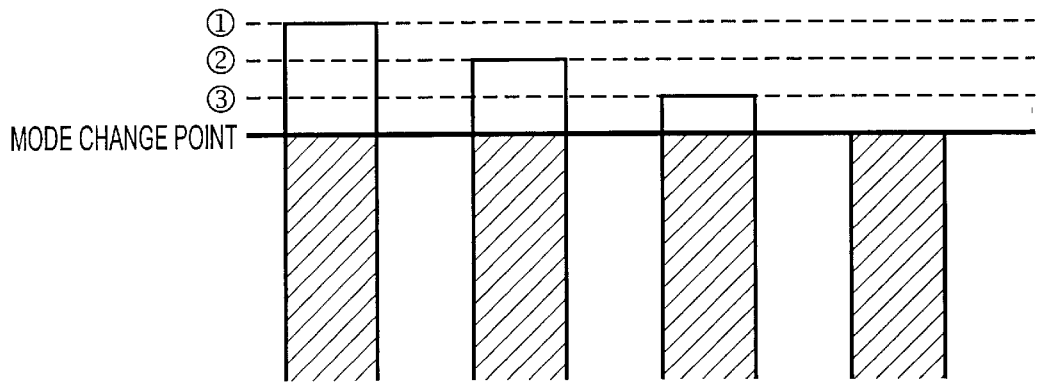
FIGS. 20A to 20D are schematic representation of a fourth example of the operation in the vicinity of a mode change point at the mode change time from the color mode to the black mode.

FIG. 20 is a schematic representation of a fourth example of the operation in the vicinity of the mode change point at the mode change time from the color mode to the black mode. In this example, recording paper feed is controlled so that the rear end of the black head comes to the position by three times the minute move width before the mode change point. Horizontal scanning is executed, namely, as shown in (8) in FIG. 16, the first horizontal scanning is executed over the area between the mode change point and the line immediately preceding the line g. At this time, as shown in (A) in FIG. 20, print is not executed for the area before the mode change point.

Next, recording paper feed is controlled by the minute move width. Horizontal scanning is executed, namely, as shown in (9) in FIG. 16, the second horizontal scanning is executed over the area between the mode change point and the line immediately preceding the line g, and the second horizontal scanning is executed over the area between the line g and the line immediately preceding the line h. As shown in (B) in FIG. 20, print is not executed for the area before the mode change point.

Likewise, recording paper feed is controlled by the minute move width. Horizontal scanning is executed, namely, as shown in (10) in FIG. 16, the third horizontal scanning is executed over the area between the mode change point and the line immediately preceding the line g, the second horizontal scanning is executed over the area between the line g and the line immediately preceding the line h, and the first horizontal scanning is executed over the area between the line h and the line immediately preceding the line i. In this case, as shown in (C) in FIG. 20, print is not executed either for the area before the mode change point.

Further, recording paper feed is controlled by the minute move width for setting the rear end of the black head to the mode change point. Horizontal scanning is executed, namely, as shown in (11) in FIG. 16, the fourth horizontal scanning is executed over the area between the mode change point and the line immediately preceding the line g, the third horizontal scanning is executed over the area between the line g and the line immediately preceding the line h, the second horizontal scanning is executed over the area between the line h and the line immediately preceding the line i, and the first horizontal scanning is executed over the area between the line i and the line immediately preceding the line j.

In the example, the image can be formed by executing horizontal scanning twice or more times over all the area after the mode change point, so that the effect of the variations in the print elements can be almost excluded. However, the rear end of the head remains in the area after the head straddles the mode change point, thus in the last horizontal scanning in the color mode, the distance between the mode change point and the rear end of the head requires a width three times as wide as the minute move width or more. If the distance between the mode change point and the rear end of the head is smaller than that width, it becomes necessary to repeat horizontal scanning in the color mode once more or again set the mode change point, for example.

Thus, while a move is made in the vertical scanning direction a minute move width at a time, horizontal scanning is executed as many times as the number of print divisions (in this case, four), and the initialization operation is performed in the black mode, then the print operation may be performed in the normal black mode. In the initialization operation in the black mode, the same line is not printed with the same print element in most areas, so that occurrence of inconsistencies in density, a white stripe, etc., caused by the variations in the print elements in the vicinity of the mode change point can be suppressed.

In the specific examples, black data is printed together with yellow in the color mode, but the scope of the invention is not limited to it; black data may be printed together with cyan or magenta. Particularly, black data is printed together with cyan, whereby color blur is made inconspicuous and it can be expected that the image quality improves.

In the specific examples, the number of print divisions is four, but the scope of the invention is not limited to it; any number of print divisions can be adopted for print control. In this case, at the mode change time, while a move is made in the vertical scanning direction a minute move width at a time, horizontal scanning may be repeated as many times as the number of print divisions.

The specific examples have been described for the operation at the print mode change time from the black mode to the color mode and from the color mode to the black mode. The scope of the invention is not limited to the change operation between the two print modes. For example, in the change operation between various print modes of the normal print mode, a photo mode, a high-speed print mode, etc., or in the change operation of the number of print divisions, while a move is made in the vertical scanning direction a minute move width at a time in the vicinity of the mode change point, horizontal scanning can be repeated for forming the image before and after the mode change point. To change the number of print divisions, namely, to increase the number of print divisions, the operation can be performed in a similar manner to that at the change time from the black mode to the color mode described above; to decrease the number of print divisions, the operation can be performed in a similar manner to that at the change time from the color mode to the black mode described above.

Figure 21:
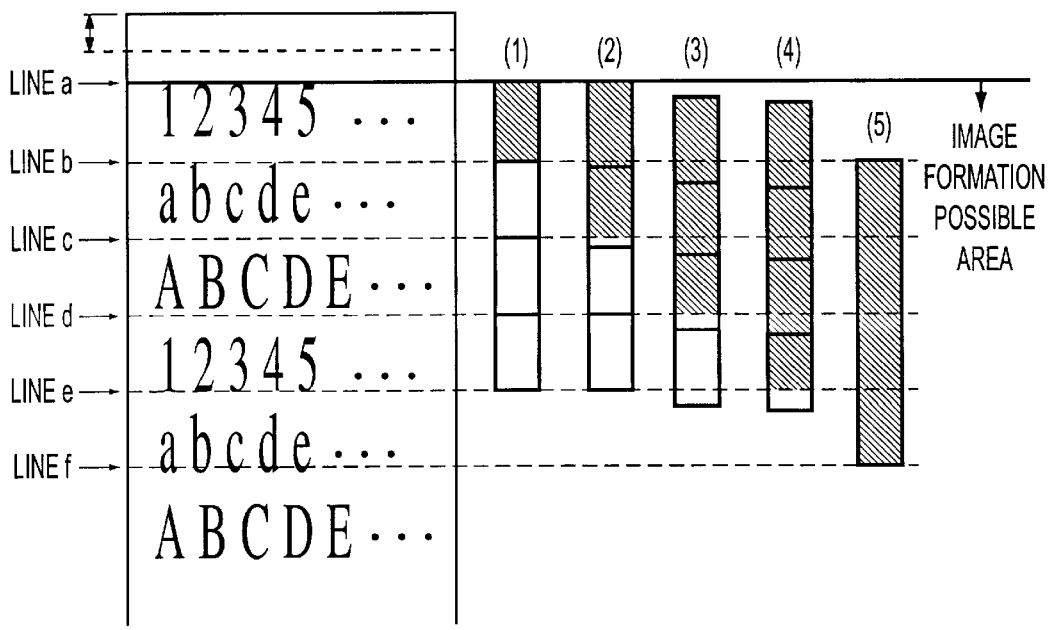
FIG. 21 is a schematic representation of a specific example in one example of the print operation in the upper margin of a recording medium in the embodiment of the invention.

FIG. 21 is a schematic representation of a specific example in one example of the print operation in the upper margin of a recording medium in the embodiment of the invention. As described above, to form an image by executing horizontal scanning as many times as the number of print divisions, an area where an incomplete image is provided occurs if an attempt is made to form an image as the normal operation is performed. In related art, in the upper and lower margins of a recording medium, horizontal scanning is executed as many times as the number of print divisions without making a feed in the vertical scanning direction; in the invention, however, while a move is made a minute move width at a time in the vertical scanning direction, horizontal scanning is executed.

In the example in FIG. 21, the number of print divisions is set to four. The print operation is started in a state in which the upper margin of the recording medium is pressed by a press mechanism (not shown). (1) to (4) in FIG. 21 show horizontal scanning executed for forming a 100% image in the vicinity of the upper end of an image formation-possible area of the recording medium. In the horizontal scanning executed four times, control is performed so that the record area is increased gradually as shown in (1) to (4) in FIG. 21. FIG. 21 shows the horizontal scanning as if the horizontal scanning were executed four times at the same vertical scanning position, but in the invention, while a move is made a minute move width at a time in the vertical scanning direction, the horizontal scanning is executed. For the horizontal scanning executed while a move is made a minute move width at a time, print control can be performed, for example, as shown in FIGS. 17 to 19, at the rear end of the head. If an increase in a print-impossible area is allowed to some extent, print control as shown in FIG. 20 may be performed. The mode change point in FIGS. 17 to 20 corresponds to the upper end of the image formation-possible area.

Figure 22:
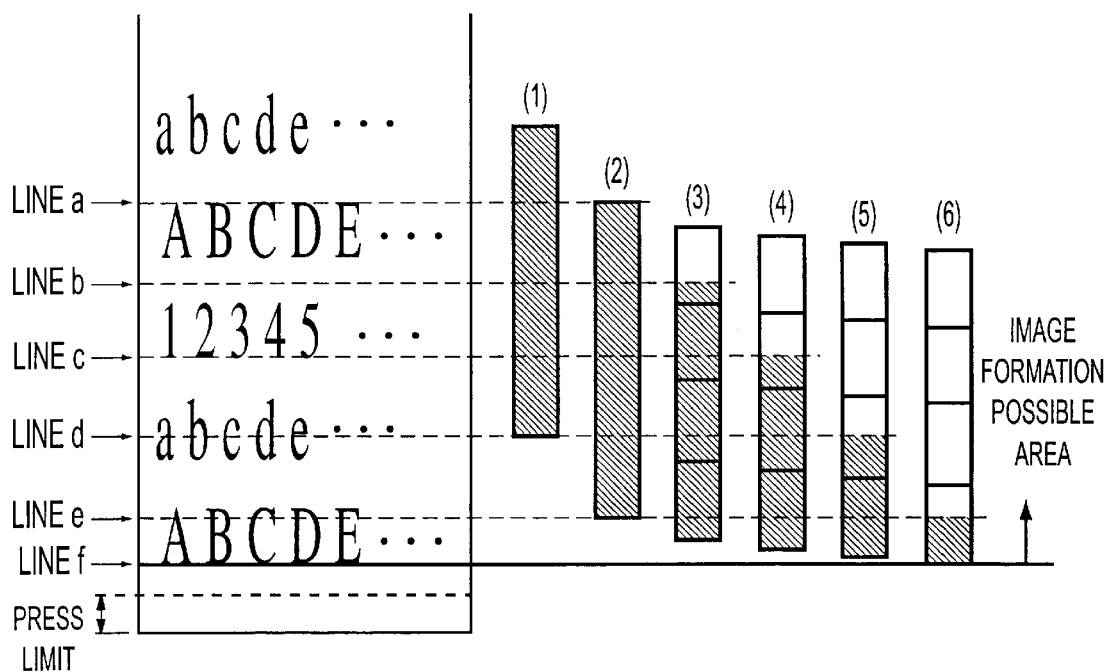
FIG. 22 is a schematic representation of a specific example in one example of the print operation in the lower margin of a recording medium in the embodiment of the invention.

FIG. 22 is a schematic representation of a specific example in one example of the print operation in the lower margin of a recording medium in the embodiment of the invention. In the example in FIG. 21 like that in FIG. 20, the number of print divisions is set to four. An image in the lower margin of the recording medium is completed in a state in which the lower margin of the recording medium is pressed by the press mechanism (not shown). At the image preread time after the horizontal scanning in (1) in FIG. 22, the next horizontal scanning is detected covering the lower end of an image formation-possible area of the recording medium. Thus, horizontal scanning is executed four times in (2) to (5) in FIG. 22 for forming a 100% image in the vicinity of the lower end of the image formation-possible area of the recording medium. In the horizontal scanning executed four times, control is performed so that the record area is decreased gradually as shown in (2) to (5) in FIG. 22. FIG. 22 shows the horizontal scanning as if the horizontal scanning were executed four times at the same vertical scanning position, but in the invention, while a move is made a minute move width at a time in the vertical scanning direction, the horizontal scanning is executed. For the horizontal scanning executed while a move is made a minute move width at a time, print control can be performed, for example, as shown in FIGS. 11 to 13, at the front end of the head. If an increase in a print-impossible area is allowed to some extent, print control as shown in FIG. 14 may be performed. The mode change point in FIGS. 11 to 14 corresponds to the lower end of the image formation-possible area.

Thus, an image is formed by performing the record operation more than once also in the upper and lower margins of a recording medium, so that blank portions of the upper and lower margins of the recording medium can be lessened for widening the image formation-possible area of the recording medium. Horizontal scanning for recording in the portions is executed while a move is made a minute move width at a time, whereby the effect of the variations in the print elements can be excluded and an image can be formed with good quality throughout the image formation-possible area.

The invention is not limited to print examples at the print mode change time or in the vicinity of the upper and lower margins of the recording medium and can be applied to all scenes where horizontal scanning was executed more than once at the same vertical scanning position formerly.

As seen from the description made so far, according to the invention, to execute horizontal scanning more than once for forming a 100% image, horizontal scanning executed more than once formerly at the same vertical scanning position at the print mode change time or in the upper and lower margins of a recording medium is executed while the recording medium is fed a minute move width at a time in the vertical scanning direction. Thus, occurrence of inconsistencies in density, white stripes, etc., caused by the variations in the print elements, etc., can be suppressed for reducing degradation of image quality.

What is claimed is:

1. An image formation method of a serial printer having a head section comprising a plurality of print elements arranged on a carriage in a vertical scanning direction for driving said head section based on image data and executing horizontal scanning over a single area a predetermined number of times to form an image, said image formation method comprising:

setting a mode change point, a line where change is made from a first print mode to a second print mode, when a plurality of print modes for forming an image are changed for printing;

forming an image to the mode change point in the first print mode;

changing the print mode to the second print mode;

forming an image just after the mode change point; and executing image formation in the normal second print mode, wherein the forming of an image just after the mode change point includes executing horizontal scanning the predetermined number of times and moving in the vertical scanning direction a minute move width smaller than a move width in the vertical scanning direction in the second print mode.

2. The image formation method as claimed in claim 1, wherein the first print mode is a color print mode and the second print mode is a black print mode, and if lines where color data does not exist continue exceeding the move width in the vertical scanning direction in the first print mode, the mode change point is set in any blank line following the lines where color data does not exist.

3. The image formation method as claimed in claim 1, wherein
the mode change point is set in a change point of an object where an image is to be formed.

4. The image formation method as claimed in claim 1, wherein during the first horizontal scanning of the forming of an image just after the mode change point, the number of print elements used for image formation is gradually decreased every number of print elements corresponding to the minute move width from an end of said print elements arranged on said head section to form the image.

5. The image formation method as claimed in claim 1, wherein during the forming of an image just after the mode change point, the image is formed with utilizing all print elements for the number of print elements corresponding to the minute move width from an end of said print elements arranged on said head section.

6. The image formation method as claimed in claim 1, wherein during the forming of an image just after the mode change point, percentage of said print elements used for each horizontal scanning is gradually decreased for the number of print elements corresponding to the minute move width from an end of said print elements arranged on said head section to form the image.

7. The image formation method as claimed in claim 1, wherein:
the forming of an image just after the mode change point is started at a position at which said head section straddles the mode change point;
control is performed so that an end of said print elements arranged on said head section becomes the mode change point after completion of the horizontal scanning executed the predetermined number of times; and
only image formation after the mode change point is performed in the horizontal scanning executed the predetermined number of times.

8. The image formation method as claimed in claim 1, wherein
changing the print mode to the second print mode, further comprises moving in the vertical scanning direction a minute move width while moving a minute move width in the vertical scanning direction in the second print mode.

9. An image formation method of a serial printer having a head section comprising a plurality of print elements arranged on a carriage in a vertical scanning direction for driving said head section based on image data and executing horizontal scanning over a single area a predetermined number of times to form an image, said image formation method comprising the steps of:
forming an image at a top of an image formation-possible area of a recording medium where an image can be formed; and
forming an image just after the top of the image formation-possible area, wherein
the forming of an image at a top of an image formation-possible area includes executing horizontal scanning the predetermined number of times and moving in the vertical scanning direction a minute move width smaller than a move width in the vertical scanning direction at subsequent image formation.

10. The image formation method as claimed in claim 9, wherein during the first horizontal scanning of the forming of an image at a top of an image formation-possible area, the number of print elements used for image formation is gradually decreased every number of print elements corresponding to the minute move width from an end of said print elements arranged on said head section to form the image.

11. The image formation method as claimed in claim 9, wherein during the forming of an image at the top of an image formation-possible area, the image is formed with utilizing all print elements for the number of print elements corresponding to the minute move width from an end of said print elements arranged on said head section.

12. The image formation method as claimed in claim 9, wherein during the forming of an image at the top of an image formation-possible area, percentage of said print elements used for each horizontal scanning is gradually decreased for the number of print elements corresponding to the minute move width from an end of said print elements arranged on said head section to form the image.

13. An image formation method of a serial printer having a head section comprising a plurality of print elements arranged on a carriage in a vertical scanning direction for driving said head section based on image data read from image memory and executing horizontal scanning over a single area a predetermined number of times to form an image, said image formation method comprising:
setting a mode change point, a line where change is made from a first print mode to a second print mode, when a plurality of print modes for forming an image as changed for printing;
forming an image to the mode change point in the first print mode;
forming an image in a vicinity of the mode change pint;
changing the print mode to the second print mode; and
executing image formation after the mode change point, wherein
the forming of an image in the vicinity of the mode change point includes executing horizontal scanning the predetermined number of times and moving in the vertical scanning direction a minute move width smaller than a move width in the vertical scanning direction in the first print mode.

14. The image formation method as claimed in claim 13, wherein
the first print mode is a black print mode and the second print mode is a color print mode, and
the mode change point is set in any blank line preceding a line where color data exists.

15. The image formation method as claimed in claim 13, wherein
the mode change point is set in a change point of an object where an image is to be formed.

16. The image formation method as claimed in claim 13, wherein during the last horizontal scanning of the forming of an image in the vicinity of the mode change point, the number of print elements used for image formation is gradually decreased every number of print elements corresponding to the minute move width from an end of said print elements arranged on said head section to form the image.

17. The image formation method as claimed in claim 13, wherein during the forming of an image in the vicinity of the mode point, the image is formed with utilizing all print elements for the number of print elements corresponding to the minute move width from an end of said print elements arranged on said head section.

18. The image formation method as claimed in claim 13, wherein during the forming of an image in a vicinity of the mode change point, percentage of said print elements used for each horizontal scanning is gradually decreased for the number of print elements corresponding to the minute move width from an end of said print elements arranged on said head section to form the image.

19. The image formation method as claimed in claim 13, wherein:
the forming of an image in the vicinity of the mode change point is started at a position at which an end of said print elements arranged on said head section becomes the mode change point;
control is performed so that said head section straddles the mode change point after completion of the horizontal scanning executed the predetermined number of times; and
only image formation to the mode change point is performed in the horizontal scanning executed the predetermined number of times.

20. An image formation method of a serial printer having a head section comprising a plurality of print elements arranged on a carriage in a vertical scanning direction for driving said head section based on image data and executing horizontal scanning over a single area a predetermined number of times to form an image, said image formation method comprising:
forming an image to a rear end of an image formation-possible area where an image can be formed; and
forming an image at the rear end of the image formation-possible area, wherein the forming of an image at the rear end of the image formation-possible area includes executing horizontal scanning the predetermined number of times and moving in the vertical scanning direction a minute move width smaller than a move width in the vertical scanning direction at preceding image formation.

21. The image formation method as claimed in claim 20, wherein during the last horizontal scanning of the forming of an image at the rear end of the image formation-possible area, the number of print elements used for image formation is gradually decreased every number of print elements corresponding to the minute move with from an end of said print elements arranged on said head section to form the image.

22. The image formation method as claimed in claim 20, wherein during the forming of an image at the rear end of the image formation-possible area, the image is formed with utilizing all print elements for the number of print elements corresponding to the minute move width from an end of said print elements arranged on said head section.

23. The image formation method as claimed in claim 20, wherein during the forming of an image at the rear end of the image formation-possible area, percentage of said print elements used for each horizontal scanning is gradually decreased for the number of print elements corresponding to the minute move width from an end of said print elements arranged on said head section to form the image.

24. An image formation control system for controlling a serial printer for using a head section comprising a plurality of print elements arranged on a carriage in a vertical scanning direction and driving said head section based on image data for executing horizontal scanning over a single area a predetermined number of times to form an image, said image formation control system comprising:
head position management means for managing at least a position and a print width of said head section to form an image in response to a print mode; and
image transfer means for transferring an image to said head section in accordance with the head position and print width determined by said head position management means, wherein said head position management means sets a mode change point, a line where change is made from a first print mode to a second print mode, and performs control to form an image to the mode change point in the first print mode, then to change the print mode to the second print mode, then to form an image just after the mode change point by executing horizontal scanning the predetermined number of times and by moving in the vertical scanning direction at minute move width smaller than a move width in the vertical scanning direction in the second print mode, then to execute image formation in the normal section print mode.

25. The image formation control system as claimed in claim 24, wherein
the first print mode is a print mode and the second print mode is a black print mode, and wherein
if lines where color data does not exist continue exceeding the move width in the vertical scanning direction in the first print mode, said head position management means sets the mode change point in any blank lines following the lines where color data does not exist.

26. The image formation control system as claimed in claim 24, wherein
said head position management means sets the mode change point in a change point of an object where an image is to be formed.

27. The image formation control system as claimed in claim 24, wherein during the forming of an image just after the mode change point, said head position management means performs control, in the first horizontal scanning, so as to gradually decrease the number of print elements used for image formation every number of print elements corresponding to the minute move width from an end of the print elements arranged on said head section for forming the image.

28. The image formation control system as claimed in claim 24, wherein during the forming of an image just after the mode change point, said head position management means performs control to form the image with utilizing all print elements for the number of print elements corresponding to the minute move width from an end of said print elements arranged on said head section.

29. The image formation control system as claimed in claim 24, wherein during the forming of an image just after the mode change point, said head position management means performs control so as to gradually decrease percentage of said print elements used for each horizontal scanning for the number of print elements corresponding to the minute move width front an end of said print elements arranged on said head section for forming the image.

30. The image formation control system as claimed in claim 24, wherein
said head position management means performs control so as to start the forming of an image just after the mode change point at a position at which said head section straddles the mode change point, and performs control so that an end of said print elements arranged on said head section becomes the mode change point after completion of the horizontal scanning executed the predetermined number of times, and
only image formation after the mode change point is performed in the horizontal scanning executed the predetermined number of times.

31. An image formation control system for controlling a serial printer for using a head section, comprising:
a plurality of print elements arranged on a carriage in a vertical scanning direction and driving said head section based on image data for executing horizontal scanning over a single area a predetermined number of times to form an image, wherein said image formation control system comprises:
head position management means for managing at least a position and a print width of said head section to form an image and image transfer means for transferring an image to said head section in accordance with the head position and print width determined by said head position management means, and wherein said head position management means performs control so as to form an image at a top of an image formation-possible area of a recording medium where an image can be formed by executing horizontal scanning the predetermined number of times and by moving in the vertical scanning direction a minute move width smaller than a move width in the vertical scanning direction at subsequent image formation, and to form an image just after the top of the image formation-possible area.

32. The image formation control system as claimed in claim 31, wherein during the forming of an image at the top of the image formation-possible area, said head position management means performs control, in the first horizontal scanning, so as to gradually decrease the number of print elements used for image formation every number of print elements corresponding to the minute move width from an end of the print elements arranged on said head section for forming the image.

33. The image formation control system as claimed in claim 31, wherein during the forming of an image at the top of the image formation-possible area, said head position management means performs control to form the image with utilizing all print elements for the number of print elements corresponding to the minute move width from an end of said print elements arranged on said head section.

34. The image formation control system as claimed in claim 31, wherein during the forming of an image at the top of the image formation-possible area, said head position management means performs control so as to gradually decrease percentage of said print elements used for each horizontal scanning for the number of print elements corresponding to the minute move width from an end of said print elements arranged on said head section for forming the image.

35. An image formation control system for controlling a serial printer for using a head section comprising a plurality of print elements arranged on a carriage in a vertical scanning direction and driving said head section based on image data for executing horizontal scanning over a single area a predetermined number of times to form an image, said image formation control system, comprising:
head position management means for managing at least a position and a print width of said head section to form an image in response to a print mode; and
image transfer means for transferring an image to said head section in accordance with the head position and print width determined by said head position management means, wherein said head position management means sets a mode change point, a line where change is made from a first print mode to a second print mode, and performs control to form an image to the mode change point in the first print mode, then to form an image in a vicinity of the mode change point by executing horizontal scanning the predetermined number of times and by moving in the vertical scanning direction a minute move width smaller than a move width in the vertical scanning direction in the first print mode, then to change the print mode to the second print mode, and to execute image formation after the mode change point.

36. The image formation control system as claimed in claim 35, wherein
the first print mode is a black print mode and the second print mode is a color print mode, and
said head position management means sets the mode change point in any blank line preceding a line where color data exists.

37. The image formation control system as claimed in claim 35, wherein
said head position management means sets the mode change point in a change point of an object where an image is to be formed.

38. The image formation control system as claimed in claim 35, wherein during the forming of an image in the vicinity of the mode change point, said head position management means performs control, in the last horizontal scanning, so as to gradually decrease the number of print elements used for image formation every number of print elements corresponding to the minute move width from an end of said print elements arranged on said head section for forming the image.

39. The image formation control system as claimed in claim 35, wherein during the forming of an image in the vicinity of the mode change point, said head position management means performs control to form the image with utilizing all print elements for the number of print elements corresponding to the minute move width from an end of said print elements arranged on said head section.

40. The image formation control system as claimed in claim 35, wherein during the forming of an image in the vicinity of the mode change point, said head position management means performs control so as to gradually decrease percentage of said print elements used for each horizontal scanning for the number of print elements corresponding to the minute move width from an end of said print elements arranged on said head section for forming the image.

41. The image formation control system as claimed in claim 35, wherein:
said head position management means performs control so as to start the forming of an image in the vicinity of the mode change point at a position at which an end of the print elements arranged on said head section becomes the mode change point, and performs control so that said head section straddles the mode change point after completion of the horizontal scanning executed the predetermined number of times; and
only image formation to the mode change point is performed in the horizontal scanning executed the predetermined number of times.

42. An image formation control system for controlling a serial printer for using a head section comprising a plurality of print elements arranged on a carriage in a vertical scanning direction and driving said head section based on image data for executing horizontal scanning over a single area a predetermined number of times to form an image, said image formation control system, comprising:
head position management means for managing at least a position and a print width of said head portion to form an image; and image transfer means for transferring an image to said head section to accordance with the head position and print width determined by said head position management means, wherein said head position management means performs control so as to form an image to a rear end of an image formation-possible area of a recording medium where an image can be formed, then to form an image at the rear end of the image formation-possible area by executing horizontal scanning the predetermined number of times and by moving in the vertical scanning direction a minute move width smaller than a move width in the vertical scanning direction at preceding image formation.

43. The image formation control system as claimed in claim 42, wherein during the forming of an image at the rear end of the image formation-possible area, said head position management means performs control, in the last horizontal scanning, so as to gradually decrease the number of print elements used for image formation every number of print elements corresponding to the minute move width from an end of said print elements arranged on said head section for forming the image.

44. The image formation control system as claimed in claim 42, wherein during the forming of an image at the rear end of the image formation-possible area, said head position management means performs control to form the image with utilizing all print elements for the number of print elements corresponding to the minute move width from an end of said print elements arranged on said head section.

45. The image formation control system as claimed in claim 42, wherein during the forming of an image at the rear end of an image formation-possible area, said head position management means performs control so as to gradually decrease percentage of said print elements used for each horizontal scanning for the number of print elements corresponding to the minute move width from an end of said print elements arranged on said head section for forming the image.

46. An image formation system comprising a head section having a plurality of print elements arranged in a vertical scanning direction, a carriage on which said head section is placed, and drive means for driving said head section and said carriage based on image data for executing horizontal scanning over a single area a predetermined number of times to form an image, wherein said drive means comprises:

head position management means for managing at least a position and a print width of said head section to form an image in response to a print mode; and image transfer means for transferring an image to said head section in accordance with the head position and print width determined by said head position management means, and wherein said head position management means sets a mode change point, a line where change is made from a first print mode to a second print mode, and performs control to form an image to the mode change point in the first print mode, then to change the print mode to the second print mode, then to form an image just after the mode change point by executing horizontal scanning the predetermined number of times and by moving in the vertical scanning direction a minute move width smaller than a move width in the vertical scanning direction in the second print mode, then to execute image formation in the normal second print mode.

47. An image formation system, comprising:
a head section having a plurality of print elements arranged in a vertical scanning direction;
a carriage on which said head section is placed; and
drive means for driving said head section and said carriage based on image data for executing horizontal scanning over a single area a predetermined number of times to form an image, wherein said drive means comprises:

head position management means for managing at least a position and a print width of said head section to form an image; and image transfer means for transferring an image to said head section in accordance with the head position and print width determined by said head position management means, and wherein said head position management means performs control so as to form an image at a top of an image formation-possible area of a recording medium where an image can be formed by executing horizontal scanning the predetermined number of times and by moving in the vertical scanning direction a minute move width smaller than a move width in the vertical scanning direction at subsequent image formation, and to form an image just after the top of the image formation-possible area.

48. An image formation system, comprising:
a head section having a plurality of print elements arranged in a vertical scanning direction;
a carriage on which said head section is placed; and
drive means for driving said head section and said carriage based on image data for executing horizontal scanning over a single area a predetermined number of times to form an image, wherein said drive means comprises:

head position management means for managing at least a position and a print width of said head section to form an image in response to a print mode; and image transfer means for transferring an image to said head section in accordance with the head position and print width determined by said head position management means, wherein said head position management means sets a mode change point, a line where change is mode from a first print mode to a second print mode, and performs control to form an image to the mode change point in the first print mode, then to form an image in a vicinity of the mode change point by executing horizontal scanning the predetermined number of times and by moving in the vertical scanning direction a minute move width smaller than a move width in the vertical scanning direction in the first print mode, then to change the print mode to the second print mode, and to execute image formation after the mode change point.

49. An image formation system, comprising:
a head section having a plurality of print elements arranged in a vertical scanning direction;
a carriage on which said head section is placed; and
drive means for driving said head section and said carriage based on image data for executing horizontal scanning over a single area a predetermined number of times to form an image, wherein said drive means comprises:

head position management means for managing at least a position and a print width of said head section to form an image; and image transfer means for transferring an image to said head section in accordance with the head position and print width determined by said head position management means, wherein said head position management means performs control so as to form an image to a rear end of the image formation-possible area of a recording medium where an image can be formed, then to form an image at the rear end of an image formation-possible area by executing horizontal scanning the predetermined number of times and by moving in the vertical scanning direction a minute move width smaller than a move width in the vertical scanning direction at preceding image formation.

* * * * *